United States Patent
Lee et al.

(10) Patent No.: US 9,054,881 B2
(45) Date of Patent: Jun. 9, 2015

(54) RADIO FREQUENCY IDENTIFICATION (RFID) TAG AND INTERROGATOR FOR SUPPORTING NORMAL MODE AND SECURE MODE, AND OPERATION METHOD THEREOF

(75) Inventors: Sang Yeoun Lee, Daejeon (KR); Kang Bok Lee, Daejeon (KR); Heyung Sub Lee, Daejeon (KR); Dong Beom Shin, Daejeon (KR); Hyun Seok Kim, Jeollabuk-do (KR); You Sung Kang, Daejeon (KR); Joo Sang Park, Daejeon (KR); Cheol Sig Pyo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 13/108,397

(22) Filed: May 16, 2011

(65) Prior Publication Data

US 2011/0279235 A1    Nov. 17, 2011

(30) Foreign Application Priority Data

May 14, 2010  (KR) ................. 10-2010-0045364
Nov. 12, 2010  (KR) ................. 10-2010-0112963
May 13, 2011  (KR) ................. 10-2011-0045159

(51) Int. Cl.
| | |
|---|---|
| H04L 9/32 | (2006.01) |
| H04W 12/06 | (2009.01) |
| G06F 21/44 | (2013.01) |
| H04L 29/06 | (2006.01) |

(52) U.S. Cl.
CPC ............. *H04L 9/3273* (2013.01); *H04W 12/06* (2013.01); *H04L 63/0869* (2013.01); *H04L 63/08* (2013.01); *G06F 21/445* (2013.01); *H04L 9/3271* (2013.01); *G06F 21/44* (2013.01); *H04L 2209/805* (2013.01); *H04Q 2213/095* (2013.01)

(58) Field of Classification Search
CPC ... H04L 63/08; H04L 9/3271; H04L 63/0869; G06F 21/44; G06F 21/445; H04W 12/06
USPC ............. 380/258; 705/67; 713/155, 161, 168, 713/169; 726/1–36; 340/5.8, 10.1
See application file for complete search history.

(56) References Cited

U.S. PATENT DOCUMENTS

| | | | |
|---|---|---|---|
| 2008/0106386 A1* | 5/2008 | Li et al. .................. | 340/10.5 |
| 2009/0092248 A1* | 4/2009 | Rawson ................... | 380/45 |
| 2011/0066853 A1* | 3/2011 | Engels et al. ............ | 713/168 |

FOREIGN PATENT DOCUMENTS

| | | |
|---|---|---|
| JP | 4423206 | 3/2010 |
| KR | 1020070034425 | 3/2007 |
| KR | 1020090061118 | 6/2009 |
| KR | 1020100010010 | 1/2010 |

* cited by examiner

*Primary Examiner* — Daniell L Negron
*Assistant Examiner* — Benyam Haile
(74) *Attorney, Agent, or Firm* — Nelson Mullins Riley & Scarborough LLP; Anthony A. Laurentano, Esq.

(57) ABSTRACT

A Radio Frequency Identification (RFID) tag and an interrogator that support a normal mode and a secure mode, and operating methods thereof are provided. The RFID tag may notify the interrogator of whether a current operating mode of the RFID tag is the normal mode or the secure mode, may perform different inventory processes based on the current operating mode, and may perform an authentication of the interrogator. Here, the RFID tag and the interrogator may also perform a mutual authentication.

13 Claims, 14 Drawing Sheets

RADIO FREQUENCY IDENTIFICATION (RFID) TAG AND INTERROGATOR FOR SUPPORTING NORMAL MODE AND SECURE MODE, AND OPERATION METHOD THEREOF

CROSS-REFERENCE TO RELATED APPLICATION

This application claims the benefit of Korean Patent Application Nos. 10-2010-0045364, 10-2010-0112963, and 10-2011-0045159, respectively filed on May 14, 2010, Nov. 12, 2010, and May 13, 2011, in the Korean Intellectual Property Office, the disclosure of which is incorporated herein by reference.

BACKGROUND

1. Field of the Invention

The present invention relates to a technology for providing a plurality of operating modes, in a Radio Frequency Identification (RFID) TAG having an RFID tag function, and in an interrogator for performing a communication with the RFID tag.

2. Description of the Related Art

With development of Radio Frequency Identification (RFID) technology, various technologies are applied to an RFID system. Here, the RFID system may include an RFID tag, and an interrogator that communicates with the RFID tag. For example, the interrogator may include an RFID reader.

In particular, according to an increase in importance of security awareness, a necessity to provide a security function in the RFID system among various technologies has been proposed.

Accordingly, there is a desire for a technology that may provide a security function, in the communication between the RFID tag and the interrogator.

Furthermore, there is a desire for a technology that may support both an existing RFID tag function and the security function.

SUMMARY

An aspect of the present invention provides a technology that may provide a security function in a Radio Frequency Identification (RFID) system configured with an RFID tag and an interrogator.

Another aspect of the present invention provides a technology that may support both a security function and an existing RFID tag function, depending on circumstances.

According to an aspect of the present invention, there is provided a method of operating an RFID tag, the method including: determining whether a current operating mode of the RFID tag is a normal mode or a secure mode; and transitioning from a current operating state to another operating state, based on the current operating mode.

The method may further include encrypting Protocol Control (PC) information, a parameter XPC_W1, a parameter XPC_W2, and tag identification information, and transmitting, to an interrogator, the encrypted PC information, the encrypted parameter XPC_W1, the encrypted parameter XPC_W2, and the encrypted tag identification information, when the current operating mode is determined to be the secure mode. Here, the tag identification information may include Unique Item Identification (UII) information, or Electronic Product Code (EPC) information.

The transitioning may include transitioning from an acknowledged state to a secured state, by transmitting, to the interrogator, the encrypted PC information, the encrypted parameter XPC_W1, the encrypted parameter XPC_W2, and the encrypted tag identification information, and completing an inventory process, through the transitioning to the secured state.

The determining may include performing an authentication of the interrogator, and forming a secure channel, when the current operating mode is determined to be the normal mode or the secure mode.

The determining may further include determining whether to maintain or terminate the secure channel, based on whether the authentication of the interrogator using the secure channel succeeds.

The performing may include generating challenge tag information, encrypting the generated challenge tag information and transmitting the encrypted challenge tag information to the interrogator, decrypting challenge tag information re-encrypted by the interrogator, and comparing the decrypted challenge tag information with the generated challenge tag information and performing the authentication of the interrogator.

According to another aspect of the present invention, there is provided an RFID tag including: an operating mode determination unit to determine whether a current operating mode of the RFID tag is a normal mode or a secure mode; and an operating state transitioning unit to transition from a current operating state to another operating state, based on the current operating mode.

According to another aspect of the present invention, there is provided a method of operating an interrogator, the method including: determining whether a current operating mode of a tag is a normal mode or a secure mode; and performing an authentication of the tag, based on the current operating mode of the tag.

The performing may include performing the authentication of the tag, using challenge length information, challenge tag information, and challenge interrogator information, when the current operating mode of the tag is determined to be the normal mode. Here, the performing may include performing the authentication of the tag, or a mutual authentication between the tag and the interrogator.

The performing may include performing the authentication of the tag, using challenge length information, challenge interrogator information, a parameter RN16, and a parameter Handle, when the current operating mode of the tag is determined to be the secure mode.

The performing may include generating challenge interrogator information, decrypting the challenge interrogator information encrypted by the tag, and comparing the decrypted challenge interrogator information with the generated challenge interrogator information, and performing the authentication of the tag.

The method may further include deleting, changing, or adding a Master Key (MK) of the tag, when the authentication of the tag succeeds.

The method may further include changing the current operating mode of the tag, when the authentication of the tag succeeds.

According to another aspect of the present invention, there is provided an interrogator, including: an operating mode determination unit to determine whether a current operating mode of a tag is a normal mode or a secure mode; and an authentication unit to perform an authentication of the tag, based on the current operating mode of the tag.

According to another aspect of the present invention, there is provided a method of operating an RFID tag, the method including: determining whether the RFID tag is a secure tag or a normal tag, based on whether an encryption engine is loaded in the RFID tag; and performing, by the secure tag, a communication with a secure interrogator or a communication with a normal interrogator, based on a current operating mode of the RFID tag, when the RFID tag is determined to be the secure tag.

The determining may include determining the RFID tag to be the secure tag when the encryption engine is loaded in the RFID tag; and determining the RFID tag to be the normal tag when the encryption engine is not loaded in the RFID tag.

The performing may include performing, by the secure tag, the communication with the normal interrogator using tag identification information when the current operating mode is determined to be a normal mode. Here, the normal interrogator may include an interrogator where the encryption engine is not loaded.

The performing may include performing, by the secure tag, the communication with the secure interrogator or the normal interrogator using optional UII information when the current operating mode is determined to be a secure mode. Here, the secure interrogator may include an interrogator where the encryption engine is loaded.

The performing may include performing, by the secure tag, the communication with the secure interrogator using an encryption channel in the secure mode.

EFFECT

According to embodiments of the present invention, it is possible to provide a security function in a Radio Frequency Identification (RFID) system configured with an RFID tag and an interrogator.

Additionally, according to embodiments of the present invention, it is possible to provide various application services by supporting both a security function and an RFID tag function.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
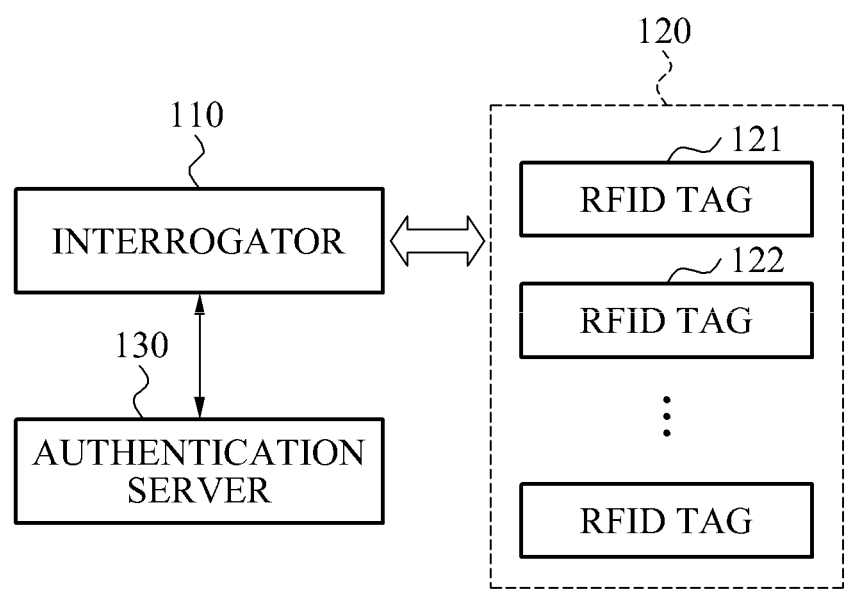
FIG. 1 is a diagram illustrating an example of a system configured with an interrogator and a Radio Frequency Identification (RFID) tag according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an example of a system configured with an interrogator and a Radio Frequency Identification (RFID) tag according to an embodiment of the present invention.

In FIG. 1, an interrogator 110 may include an RFID reader. The interrogator 110 of FIG. 1 may perform communication with a plurality of RFID tags 120, for example RFID tags 121, and 122, and may control the plurality of RFID tags 120. Here, the plurality of RFID tags 120 may support both a normal mode and a secure mode. The normal mode refers to a mode where a function of an RFID tag of the International Organization for Standardization (ISO)/International Electrotechnical Commission (IEC) 18000-6 Type C, a tag authentication, an interrogator authentication, and a mutual authentication are separately supported. Additionally, the secure mode refers to a mode where a secure channel is formed through a mutual authentication between a secure interrogator and an RFID tag, to emphasize security of communication.

For example, when the interrogator 110 selects the RFID tag 121 from among the plurality of RFID tags 120, the RFID tag 121 may determine a current operating mode of the RFID tag 121, based on a Security Mode (SM)-flag stored in a memory. For example, when the SM-flag is equal to "1", the current operating mode of the RFID tag 121 may be the secure mode. Additionally, when the SM-flag is equal to "0", the current operating mode of the RFID tag 121 may be the normal mode. Here, the SM-flag may be set in advance to "1" or "0" by the interrogator 110 that is authenticated.

Additionally, the RFID tag 121 may perform an authentication of the interrogator 110, based on the current operating mode. In an example, when a Master Key (MK) is stored in the interrogator 110, the interrogator 110 may perform an authentication of the RFID tag 121. In another example, when the MK is not stored in the interrogator 110, the interrogator 110 may perform authentication of the RFID tag 121 via an authentication server 130.

Here, the RFID tag 121 may perform the authentication of the interrogator 110, in different operating states, based on the current operating mode. Here, the interrogator 110 may perform an authentication of the RFID tag 121, if needed.

In an example, when the current operating mode is set to the secure mode, the RFID tag 121 may perform the authentication of the interrogator 110, in an acknowledged state. In this example, when the authentication succeeds, the RFID tag 121 may transition from the acknowledged state to a secured state.

In another example, when the current operating mode is set to the normal mode, the RFID tag 121 may perform the authentication of the interrogator 110, in an open state. In this example, when the authentication succeeds, the RFID tag 121 may transition from the open state to the secured state.

Figure 2:
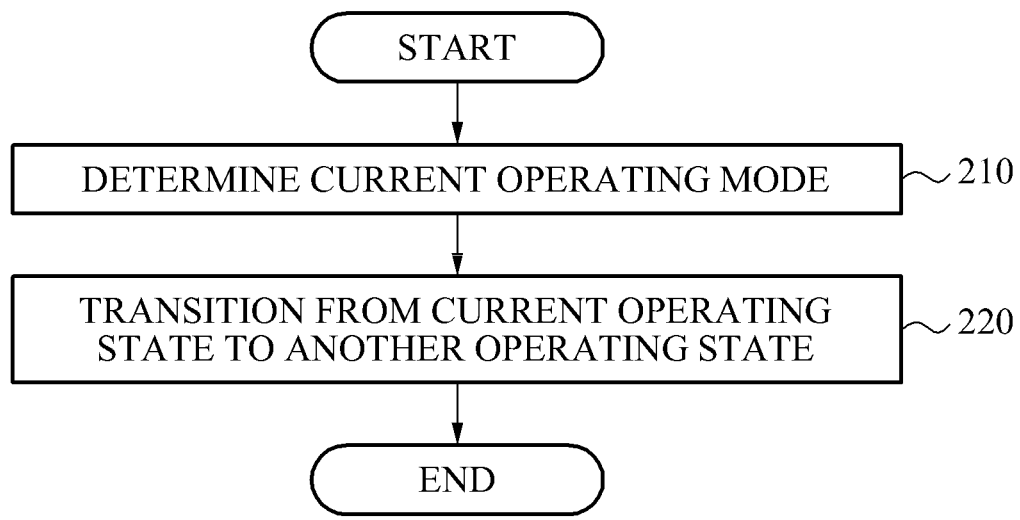
FIG. 2 is a flowchart illustrating an operation of supporting a normal mode and a secure mode in an RFID tag according to an embodiment of the present invention.

FIG. 2 is a flowchart illustrating an operation of supporting a normal mode and a secure mode in an RFID tag according to an embodiment of the present invention.

In operation 210, the RFID tag may determine whether a current operating mode of the RFID tag is the normal mode, or the secure mode.

Specifically, the RFID tag may determine whether the current operating mode of the RFID tag is the normal mode or the secure mode, by using an SM-flag set in advance by an interrogator that is authenticated in advance. For example, when the SM-flag is equal to "1", the RFID tag may determine the current operating mode to be the secure mode. Additionally, when the SM-flag is equal to "0," the RFID tag may determine the current operating mode to be the normal mode. Here, the SM-flag may be a bit existing in a memory of the RFID tag.

In operation 220, the RFID tag may transition from a current operating state to another operating state, based on the current operating mode.

In an example, when the current operating mode is determined to be the normal mode, the RFID tag may transition to the secured state or the open state, based on whether the MK exists. Specifically, when the RFID tag is in the acknowledged state, and when the MK exists, the RFID tag may transition from the acknowledged state to the secured state, through an authentication process.

In this example, when the MK does not exist, the RFID tag may transition from the acknowledged state to the secured state, without performing the authentication process. Additionally, the RFID tag may perform an authentication of the interrogator in the open state, and may transition from the open state to the secured state or to an arbitrate state, based on whether the authentication of the interrogator succeeds. Specifically, when the authentication of the interrogator succeeds, the RFID tag may transition from the open state to the secured state. Conversely, when the authentication of the interrogator fails, the RFID tag may transition from the open state to the arbitrate state.

In another example, when the current operating mode is set to the secure mode, the RFID tag may transition to the secured state or the arbitrate state, based on whether the authentication of the interrogator succeeds. Specifically, when the RFID tag is in the acknowledged state, and when the authentication of the interrogator succeeds, the RFID tag may transition from the acknowledged state to the secured state. Conversely, when the authentication of the interrogator fails, the RFID tag may transition from the acknowledged state to the arbitrate state.

Figure 3:
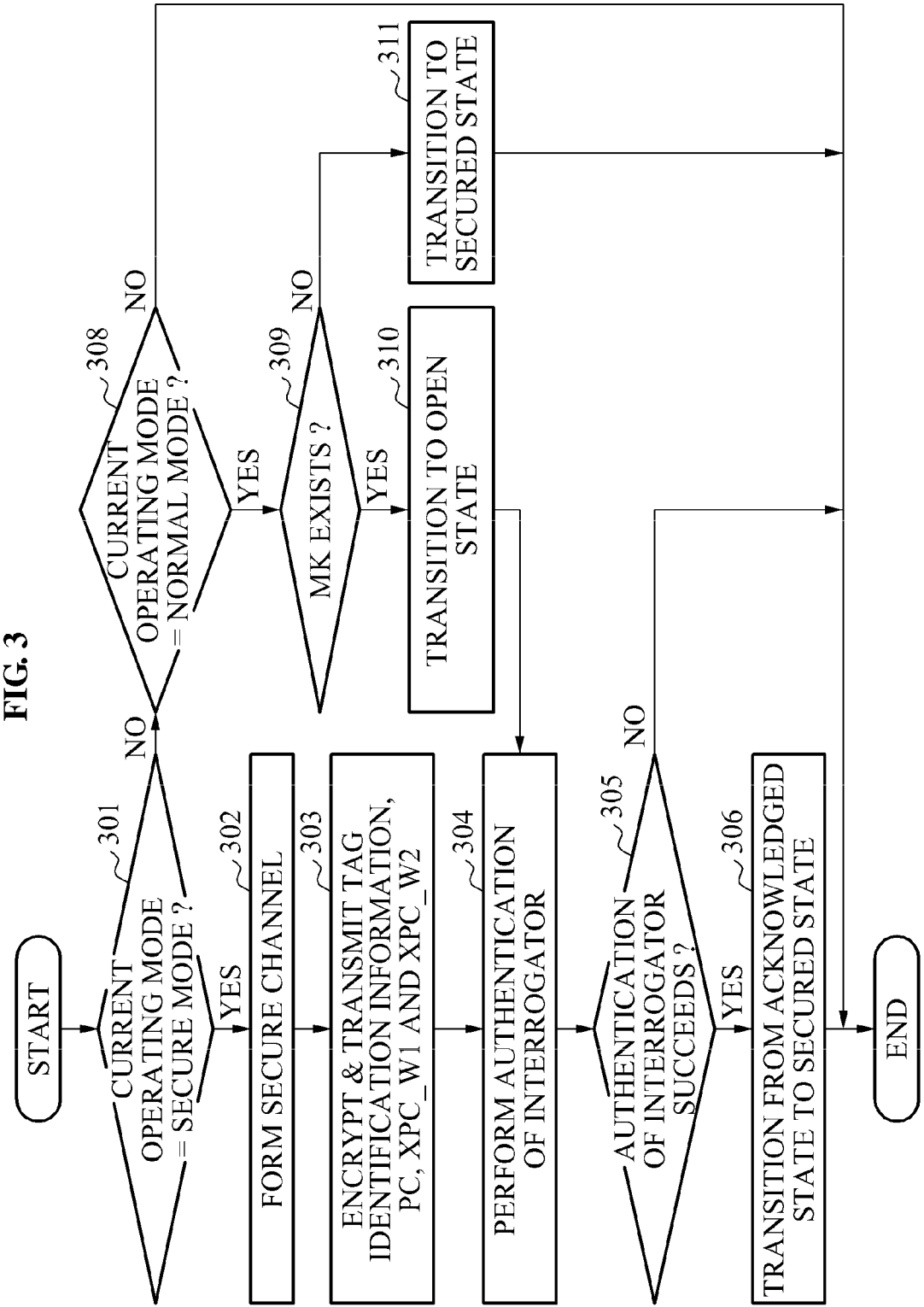
FIG. 3 is a flowchart illustrating an operation of accepting a security authentication process in an RFID tag, instead of an AP command that is a selection command, according to an embodiment of the present invention.

FIG. 3 is a flowchart illustrating an operation of accepting a security authentication process in an RFID tag, instead of an Access Password (AP) command, according to an embodiment of the present invention.

First, when an inventory process is performed, and when an ACK (RN16) is received from an interrogator in response to RN16, the RFID tag may transmit tag identification information based on a current operating mode of the RFID tag. Here, the tag identification information may include Unique Item Identification (UII) information, or Electronic Product Code (EPC) information. For example, when the ACK (RN16) is received from the interrogator in a reply state, the RFID tag may determine the current operating mode based on an SM-flag.

Referring to FIG. 3, in operation 301, when the current operating mode is determined to be the secure mode, the RFID tag may generate optional UII information. Here, the optional UII information may include a randomly generated value. Additionally, the RFID tag may transmit, to the interrogator, void UII information or untraced UII information, instead of the optional UII information. The void UII information may not have meaning, and the untraced UII information may include only a part of the tag identification information. In other words, the RFID tag may enable the interrogator tag not to recognize the tag identification information, by transmitting, to the interrogator, the optional UII information, the void UII information, or the untraced UII information in the secure mode.

Additionally, the RFID tag may set a U flag based on the generated UII information. For example, the RFID tag may set a U flag and an S flag, as shown in Table 1.

TABLE 1

| U flag | S flag | Meaning |
|---|---|---|
| 0 | 0 | General RFID tag |
| 1 | 0 | Undefined RFID tag |
| 0 | 1 | Secure tag & Normal UII information |
| 1 | 1 | Secure tag & Optional UII information |

In Table 1, in the case of a secure tag and optional UII information, the RFID tag may set both the U flag and the S flag to "1". Additionally, in the case of a secure tag and normal UII information, the RFID tag may set the U flag and the S flag to "0" and "1", respectively. Furthermore, in a current operating mode of a general RFID tag and normal UII information, the RFID tag may set both the U flag and the S flag to "0".

Additionally, in an acknowledged state, the RFID tag may transmit, to the interrogator, Protocol Control (PC) information, parameters XPC_W1 and XPC_W2, and UII information. Here, the parameters XPC_W1 may include a U flag and S flag inserted therein.

In operation 302, the RFID tag may form a secure channel with the interrogator in the acknowledged state.

For example, when a message Sec_Init is received from the interrogator, the RFID tag may initialize an encryption engine of each of the RFID tag and the interrogator, and may form a secure channel. In this example, the interrogator may be a secure interrogator. The secure interrogator may be a device for distinguishing a general RFID tag from a secure RFID tag, and may delete, modify, or change an MK of the secure RFID tag by accessing the secure RFID tag.

Subsequently, in operation 303, the RFID tag may encrypt PC information, parameters XPC_W1 and XPC_W2, and UII information, and may transmit, to the interrogator via the secure channel, the encrypted PC information, the encrypted parameters XPC_W1 and XPC_W2, and the encrypted UII information.

In operation 304, the RFID tag may perform an authentication of the interrogator using the secure channel in the acknowledged state. After performing the authentication, the RFID tag may transition from the acknowledged state to the secured state. In the secure mode, the RFID tag may complete the inventory process, through the transitioning to the secured state.

For example, the RFID tag may receive, from the interrogator via the secure channel, encrypted challenge interrogator information and an encrypted parameter RN16. Here, the encrypted challenge interrogator information may be information generated using a random function and encrypted by the interrogator. Subsequently, the RFID tag may decrypt the encrypted parameter RN16, may compare the decrypted parameter RN16 with a prestored parameter RN16, and may perform the authentication of the interrogator. Here, when the two parameters RN16 are identical to each other, the RFID tag may determine that the authentication of the interrogator succeeds. Conversely, when the two parameters RN16 are different from each other, the RFID tag may determine that the authentication of the interrogator fails.

Specifically, when the authentication of the interrogator succeeds, the RFID tag may decrypt the challenge interrogator information encrypted by the interrogator, and may re-encrypt the decrypted challenge interrogator information. Additionally, the RFID tag may encrypt a parameter Handle. Furthermore, the RFID tag may transmit, to the interrogator via the secure channel, the re-encrypted challenge interrogator information and the encrypted parameter Handle. When the re-encrypted challenge interrogator information and the encrypted parameter Handle are received, the interrogator may perform an authentication of the RFID tag, using the re-encrypted challenge interrogator information.

In operation 305, the RFID tag may determine whether to terminate the secure channel, based on whether the authentication of the interrogator succeeds.

Specifically, when the authentication of the interrogator succeeds in operation 305, the RFID tag may transition from the acknowledged state to the secured state in operation 306. When transitioning to the secured state, the RFID tag may continue to maintain the secure channel formed with connected to the interrogator. Additionally, when the RFID tag transitions to the secured state, the interrogator may delete, change, or add an MK of the RFID tag, and may change the current operating mode of the RFID tag.

Conversely, when the authentication of the interrogator fails in operation 305, the RFID tag may terminate the secure channel, and may terminate a communication with the interrogator.

When the current operating mode is determined to be the normal mode in operation 308, the RFID tag may transition from a current operating state to another operating state, based on whether an MK exists in operation 309. For example, the RFID tag may transition to the open state or the secured state, based on whether the MK exists.

Specifically, when it is determined that the MK exists in operation 309, the RFID tag may transition from the acknowledged state to the open state in operation 310. For example, when it is determined that the MK exists after a message Req_RN is received from the interrogator, the RFID tag may transition to the open state. Conversely, when it is determined that the MK does not exist, the RFID tag may transition to the secured state in operation 311.

Here, the inventory process may be completed, through the transitioning to the open state. In other words, when the current operating mode is determined to be the secure mode, the inventory process may be a process to the secured state. Additionally, when the current operating mode is determined to be the normal mode, the inventory process may be a process to the open state or to the secured state.

When the RFID tag transitions to the open state in operation 310, the RFID tag may perform the authentication of the interrogator in the open state. Here, the interrogator may perform an authentication of the RFID tag, if needed.

For example, the RFID tag and the interrogator may perform a mutual authentication, using challenge length information, challenge tag information, and challenge interrogator information.

In this example, the RFID tag may perform the same function as in the open state of the ISO/IEC 18000-6 Type C, by transitioning to the open state. Additionally, in the open state, the RFID tag may further perform functions corresponding to a security function-related command, a command related to an encryption engine initialization of a secure tag, a tag authentication command, an interrogator authentication command, and the like.

Additionally, the RFID tag may transition from the open state to the secured state or arbitrate state, based on whether an authentication succeeds. Specifically, when the authentication fails, the RFID tag may transition from the open state to the arbitrate state. Conversely, when the authentication succeeds, the RFID tag may transition from the open state to the secured state. When the RFID tag transitions to the secured state, the interrogator may add, delete, or change the MK stored in the RFID tag. Additionally, the interrogator may change the current operating mode of the RFID tag. Here, the SM-flag may be reset to "0" or "1", based on the current operating mode changed by the interrogator.

An example in which the secure channel is not formed after the mutual authentication between the RFID tag and the interrogator succeeds in the normal mode has been described above with reference to FIG. 3. However, the RFID tag may form a secure channel with the interrogator even after the mutual authentication between the RFID tag and the interrogator succeeds in the normal mode.

The operation of accepting the security authentication process, instead of the AP command in the RFID tag, and an operating state transitioning operation of the RFID tag have been described with reference to FIG. 3. Hereinafter, an operating state transitioning operation of an RFID tag when a secured state for accepting an AP command is separated from an authenticated state for accepting a security authentication process will be described with reference to FIG. 4.

Figure 4:
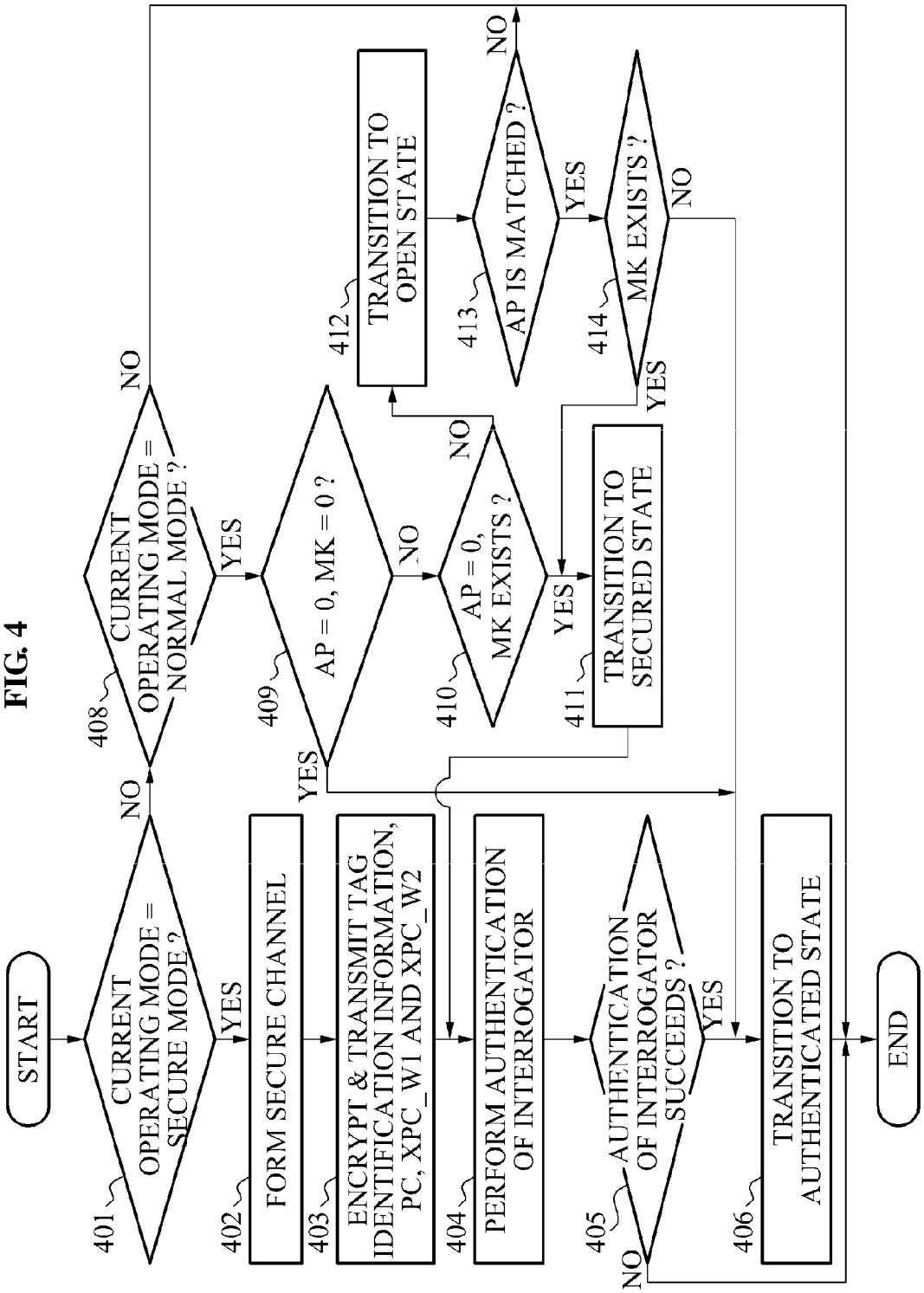
FIG. 4 is a flowchart illustrating an operation of accepting both an AP command and a security authentication process in an RFID tag, according to an embodiment of the present invention.

FIG. 4 is a flowchart illustrating an operation of accepting both an AP command and a security authentication process in an RFID tag, according to an embodiment of the present invention. In FIG. 4, an authenticated state and a secured state may be separated among operating states of the RFID tag.

In FIG. 4, in operation 401, the RFID tag may determine, based on a SM_flag, whether a current operating mode of the RFID tag is a normal mode, or a secure mode. Here, the normal mode refers to a mode where an RFID tag function of the ISO/IEC 18000-6 Type C, a tag authentication, an interrogator authentication, and a mutual authentication are separately supported. Additionally, the secure mode refers to a mode where a secure channel is formed through a mutual authentication between a secure interrogator and an RFID tag, to emphasize security of communication. In operation 401, when the current operating mode is determined to be the secure mode, the RFID tag may generate optional tag identification information. Here, when the current operating mode is determined to be normal mode, the tag identification information may include UII information or EPC information, and when the current operating mode is determined to be the secure mode, the tag identification information may include optional UII information. For example, the RFID tag may generate optional UII information using a random function.

Additionally, the RFID tag may transmit, to the interrogator, the generated UII information, PC information, and parameters XPC_W1 and XPC_W2. Here, a U flag set based on the UII information may be inserted into the parameter XPC_W1. For example, untraced UII information may be transmitted to the interrogator in the secure mode.

In operation 402, the RFID tag may form a secure channel to perform an authentication of the interrogator, in an acknowledged state.

In operation 403, the RFID tag may encrypt PC information, parameters XPC_W1 and XPC_W2, and tag identification information, and may transmit, to the interrogator via the secure channel, the encrypted PC information, the encrypted parameters XPC_W1 and XPC_W2, and the encrypted tag identification information. For example, referring to FIG. 6, the RFID tag may transmit, to the interrogator, the encrypted PC information, the encrypted parameters XPC_W1 and XPC_W2 (Enc(PC, XPC_W1(U:'0', S:'1'), XPC_W2, UII)), and the encrypted tag identification information. In this example, the parameter XPC_W2 may be used, instead of a message Get_Capabilities, to verify the encryption function of the RFID tag. When the parameter XPC_W2 is received from the RFID tag, the interrogator may determine whether the RFID tag has a tag authentication function, an interrogator authentication function, a mutual authentication function, or a function of authenticating the RFID tag using a server. In other words, the parameter XPC_W2 or the message Get_Capabilities may be used to verify 1) the encryption engine of the RFID tag, and 2) an authentication function indicating whether at least one of the tag authentication function, the interrogator authentication function, and the mutual authentication function is performed.

In operation 404, the RFID tag may perform the authentication of the interrogator, via the secure channel. Specifically, the RFID tag may perform the authentication of the interrogator, using challenge interrogator information, a parameter RN16, challenge length information, and a parameter Handle.

Specifically, the RFID tag may receive, from the interrogator via the secure channel, the challenge length information, the challenge interrogator information, and the parameter RN16 that are inserted into a message Sec_ReqRN. Here, the challenge interrogator information, and the parameter RN16 may be individually encrypted by the interrogator, and may be inserted into the message Sec_ReqRN. Additionally, the challenge interrogator information may be generated using a random function by the interrogator.

In operation 405, the RFID tag may transition to an authenticated state or an arbitrate state, based on whether the authentication of the interrogator succeeds.

In an example, when the authentication of the interrogator succeeds, the RFID tag may transition from the acknowledged state to the authenticated state in operation 406. When the RFID tag transitions to the authenticated state, the interrogator may change the current operating mode of the RFID tag. Additionally, the interrogator may change, delete, or add an MK stored in the RFID tag.

In another example, when the authentication of the interrogator fails, the RFID tag may terminate the secure channel, and may terminate a communication with the interrogator.

When the current operating mode is determined to be the normal mode in operation 408, the RFID tag may transition from the current operating state to another operating state, based on an AP and the MK. Specifically, when the AP does not exist, the RFID tag may perform the authentication of the interrogator and transition from the current operating state to another operating state, based on whether the MK exists. When the AP exists, the RFID tag may perform the authentication of the interrogator and transition from the current operating state to another operating state, using both the AP and the MK.

In an example, when it is determined that the AP and MK do not exist (AP=0, MK=0) in operation 409 after a message Req_RN is received from the interrogator, the RFID tag may transition from the acknowledged state to the authenticated state.

In another example, when it is determined that the AP does not exist, but only the MK exists (AP=0, MK< >0) in operation 410 after the message Req_RN is received from the interrogator, the RFID tag may transition from the acknowledged state to the secured state in operation 411. After transitioning to the secured state, the RFID tag may perform the authentication of the interrogator in operation 404. Additionally, the RFID tag may transition from the secured state to the authenticated state or the arbitrate state, based on whether the authentication of the interrogator succeeds.

In still another example, when it is determined that the AP exists in operation 410, the RFID tag may transition from the acknowledged state to the open state in operation 412. When transitioning to the open state, the RFID tag may perform the same function as in the open state of the ISO/IEC 18000-6 Type C. Additionally, in the open state, the RFID tag may also perform functions corresponding to a security-related command, a command related to an encryption engine initialization of a secure tag, a tag authentication command, and the like.

When the AP is matched in operation 413, the RFID tag may transition from the open state to the secured state or the authenticated state, based on whether the MK exists, in operation 414.

Specifically, when it is determined that the MK exists, the RFID tag may transition from the open state to the secured state. After transitioning to the secured state, the RFID tag may perform the authentication of the interrogator, and may transition from the secured state to the authenticated state or the arbitrate state based on whether the authentication of the interrogator succeeds. Conversely, when it is determined that the MK does not exist, the RFID tag may transition from the open state to the authenticated state.

Figure 5:
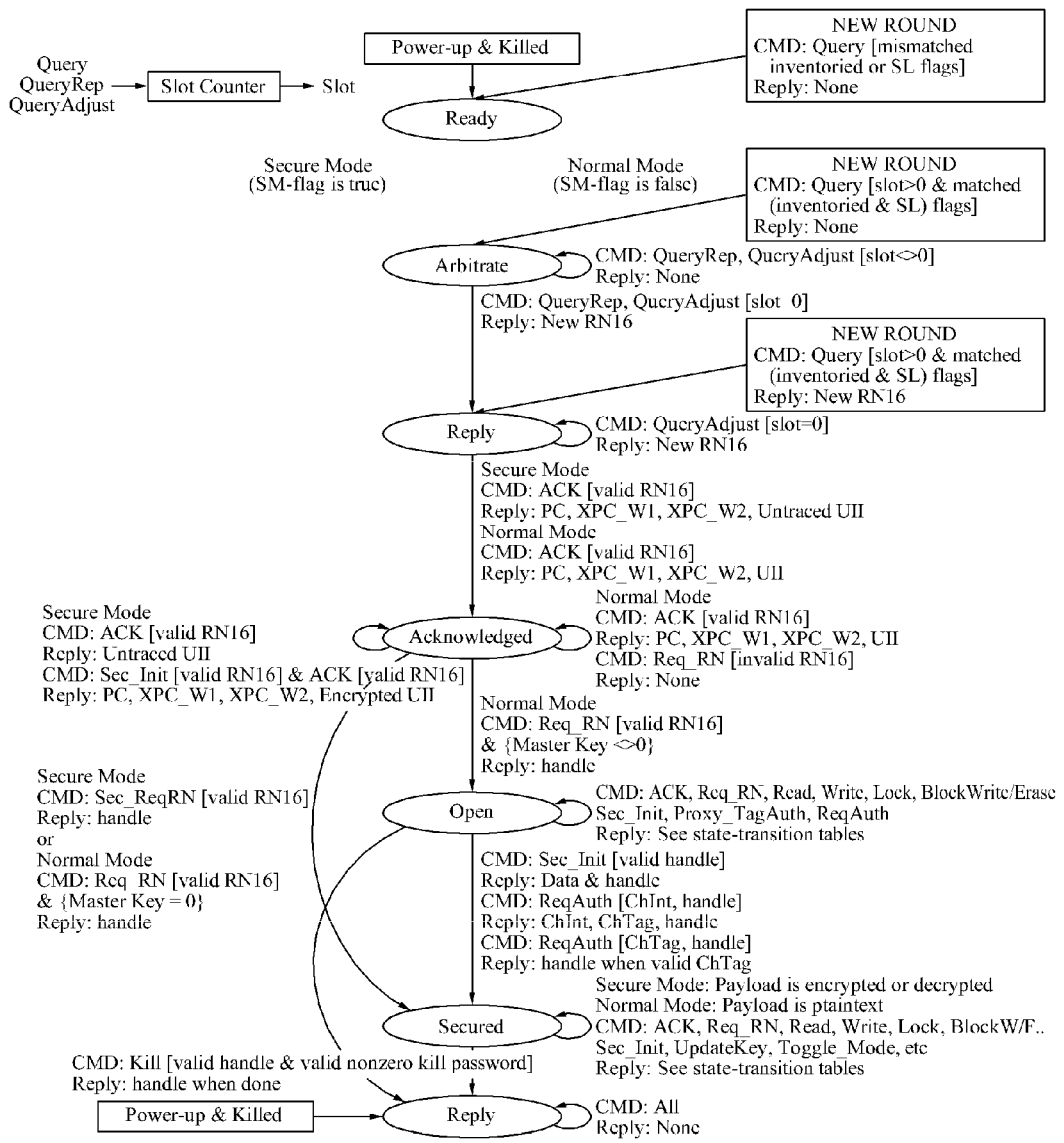
FIG. 5 is a state transition diagram of an RFID tag based on the flowchart of FIG. 3 according to an embodiment of the present invention.

FIG. 5 is a state transition diagram of the RFID tag based on the flowchart of FIG. 3. In particular, in FIG. 5, a secured state and an authenticated state may be combined into the secured state, differently from FIG. 8.

In FIG. 5, the RFID tag may receive a QueryRep from the interrogator in the arbitrate state, and may transmit, to the interrogator, the parameter RN16 in response to the QueryRep in the reply state. Additionally, when an ACK (RN16) is received from the interrogator in response to the parameter RN16, the RFID tag may transition from the reply state to the acknowledged state.

Here, the RFID tag may transition from the acknowledged state to the secured state or the open state, based on the current operating mode.

In an example, when the current operating mode is determined to be the secure mode, the RFID tag may transition from the acknowledged state to the secured state or the arbitrate state, based on whether the authentication of the interrogator succeeds. Specifically, when the authentication of the interrogator succeeds, the RFID tag may transition from the acknowledged state to the secured state. Accordingly, in the secure mode, the RFID tag may quickly perform the inventory process by transitioning to the secured state. When the authentication of the interrogator fails, the RFID tag may transition from the acknowledged state to the arbitrate state.

In another example, when the current operating mode is determined to be the normal mode, the RFID tag may transition from the acknowledged state to the open state or the secured state, based on whether the MK exists. Specifically, when the MK does not exist (MK=0), the RFID tag may transition from the acknowledged state to the secured state. Additionally, when the MK exists (MK< >0), the RFID tag may transition from the acknowledged state to the open state. After transitioning to the open state, the RFID tag may transition from the open state to the secured state or the arbitrate state, based on whether the authentication of the interrogator succeeds.

In other words, when the current operating mode is determined to be the normal mode, the inventory process may be performed until the RFID tag transitions to the open state or the secured state. Additionally, when the current operating mode is determined to be the secure mode, the inventory process may be performed until the RFID tag transitions to the secured state. Accordingly, in the secure mode, the RFID tag may quickly perform the inventory process by forming the secure channel.

Figure 6:
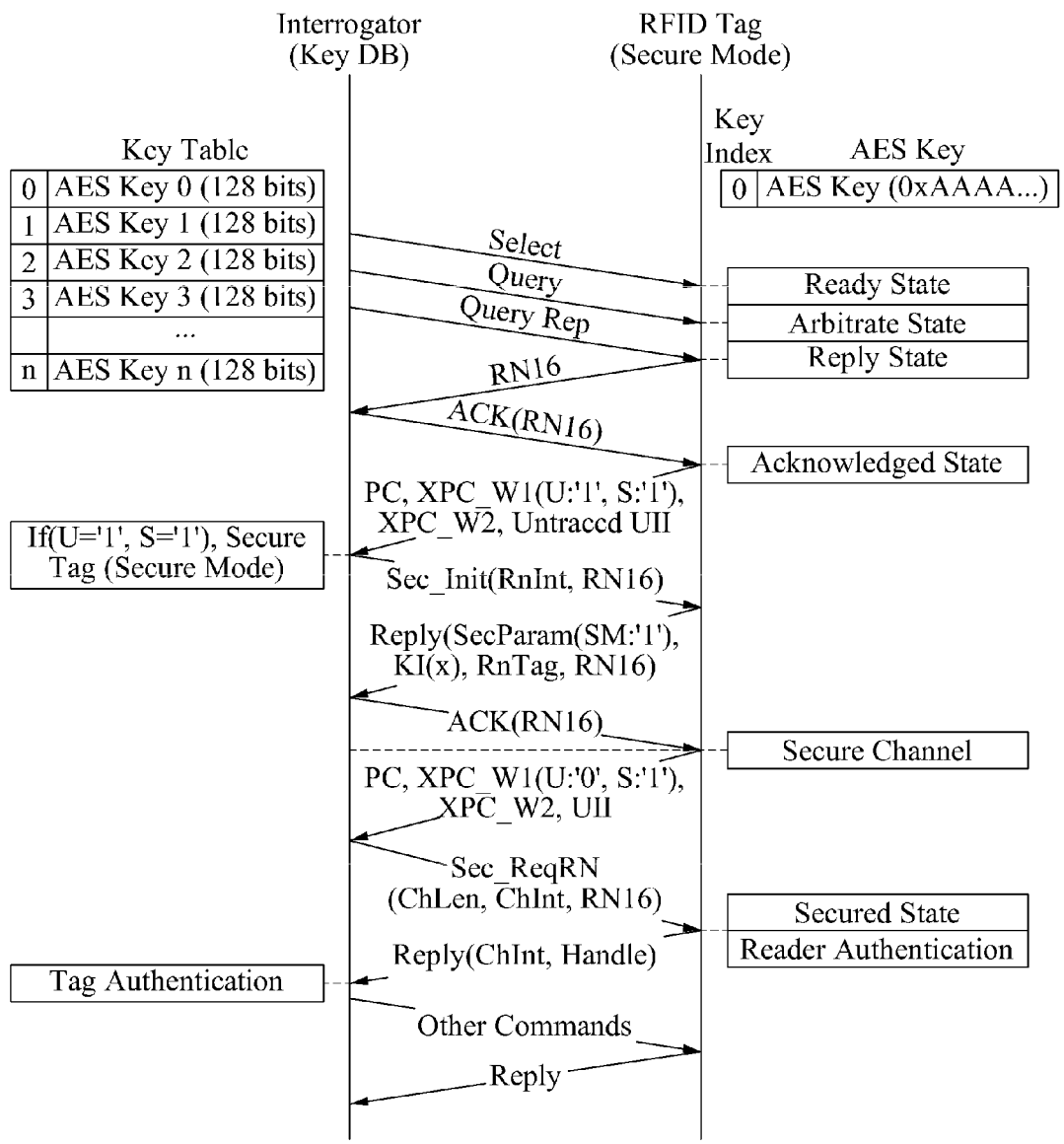
FIG. 6 is a diagram illustrating an inventory process including a mutual authentication between an RFID tag and an interrogator in a secure mode, according to an embodiment of the present invention.

FIG. 6 is a diagram illustrating a security inventory process between an RFID tag and an interrogator in a secure mode, according to an embodiment of the present invention. The security inventory process of FIG. 6 may be performed in the RFID tag operated in the secure mode, when a secured state and an authenticated state are combined.

In FIG. 6, when a secure channel is formed between the RFID tag and the interrogator, the RFID tag may encrypt PC information, parameters XPC_W1 and XPC_W2, and UII information, and may transmit, to the interrogator via the secure channel, the encrypted PC information, the encrypted parameters XPC_W1 and XPC_W2, and the encrypted UII information.

The interrogator may receive the encrypted PC information, the encrypted parameters XPC_W1 and XPC_W2, and the encrypted UII information, via the secure channel from the RFID tag, and may decrypt the received PC information, the received parameters XPC_W1 and XPC_W2, and the received UII information. Additionally, the interrogator may generate challenge interrogator information ChInt using a random function, and may individually encrypt the challenge interrogator information ChInt and a parameter RN16. Subsequently, the interrogator may insert, into a message Sec_ReqRN, the encrypted challenge interrogator information ChInt, the encrypted parameter RN16, and challenge length information ChLen, and then may transmit the message Sec_ReqRN to the RFID tag via the secure channel.

When the message Sec_ReqRN is received, the RFID tag may decrypt the parameter RN16 in the received message Sec_ReqRN, and may compare the decrypted parameter RN16 with a prestored parameter RN16. Here, the RFID tag may determine whether to terminate the secure channel with the interrogator, based on a result of the comparing.

Specifically, when the two parameters RN16 are identical to each other, the RFID tag may determine to continue to maintain the secure channel with the interrogator. In other words, when the secure channel is continuously maintained, the RFID tag may generate a parameter Handle using the random function, and may encrypt the generated parameter Handle. Conversely, when the two parameters RN16 are different from each other, the RFID tag may determine to terminate the secure channel with the interrogator, and may terminate the secure channel.

Additionally, when the secure channel is continuously maintained, the RFID tag may re-encrypt decrypted challenge interrogator information ChInt. The RFID tag may insert the re-encrypted challenge interrogator information ChInt and the encrypted parameter Handle into a message Reply, and may transmit the message Reply to the interrogator via the secure channel. When the reply message is received, the interrogator may decrypt the challenge interrogator information ChInt in the received message Reply, and may perform an authentication of the RFID tag based on whether the decrypted challenge interrogator information ChInt is identical to prestored challenge interrogator information ChInt. For example, when the decrypted challenge interrogator information ChInt is identical to the prestored challenge interrogator information ChInt, the interrogator may determine that the authentication of the RFID tag succeeds. Conversely, when the decrypted challenge interrogator information ChInt is different from the prestored challenge interrogator information ChInt, the interrogator may determine that the authentication of the RFID tag fails. When the authentication of the RFID tag fails, the interrogator may terminate the secure channel, and may terminate a communication with the RFID tag.

Additionally, when the authentication of the RFID tag succeeds, the interrogator and the RFID tag may use the parameter Handle during the communication via the secure channel. The RFID tag may compare a prestored parameter Handle with the parameter Handle received from the interrogator. As a result of the comparing, when the two parameters Handle are identical to each other, the RFID tag may determine to continue to maintain the secure channel. Conversely, when the two parameters Handle are different from each other, the RFID tag may ignore messages corresponding to the parameters Handle.

Figure 7:
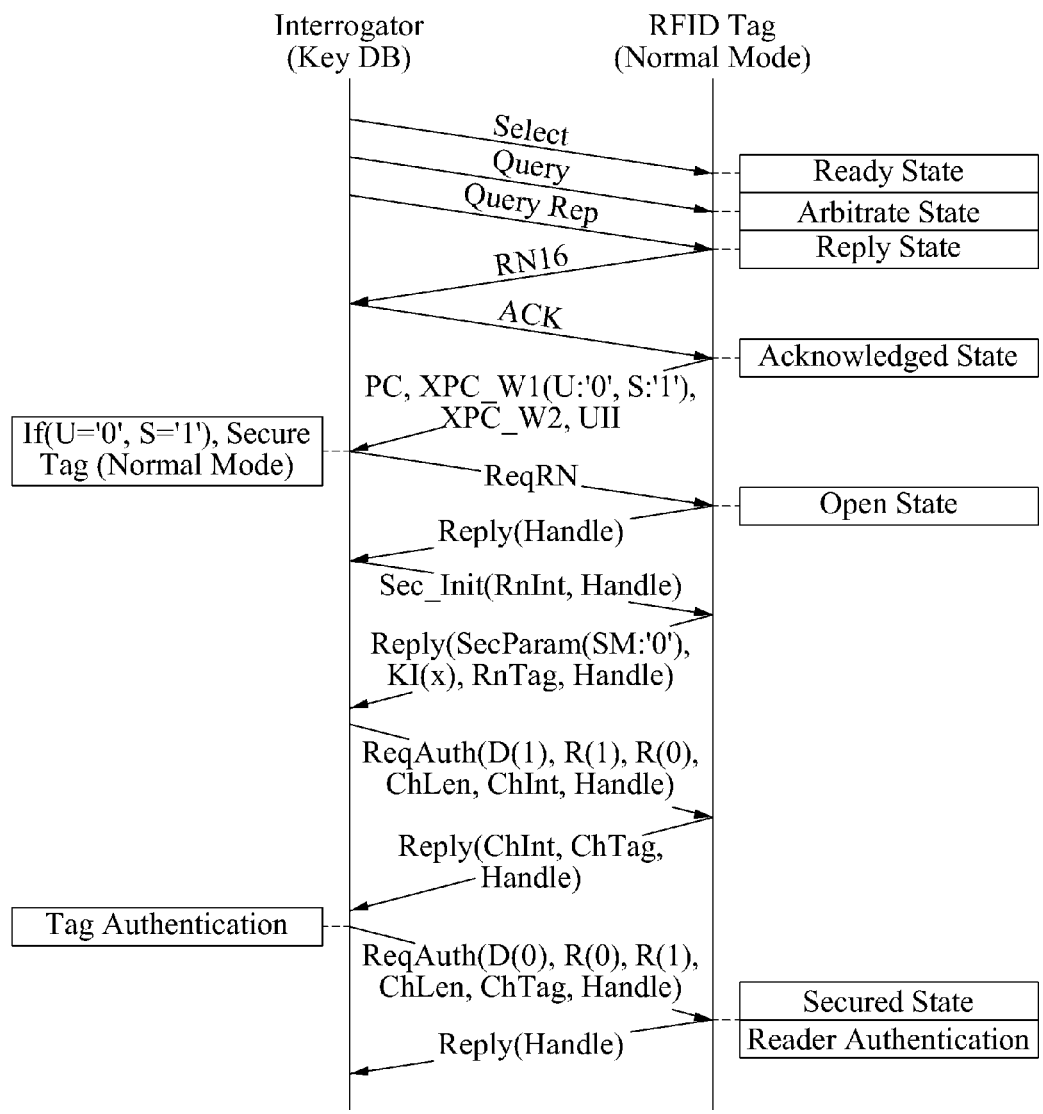
FIG. 7 is a diagram illustrating a mutual authentication process after an inventory process between an RFID tag and an interrogator in a normal mode, according to an embodiment of the present invention.

FIG. 7 is a diagram illustrating a mutual authentication process after an inventory process between an RFID tag and an interrogator in a normal mode, according to an embodiment of the present invention. In particular, FIG. 7 illustrates an example in which the RFID tag is operated in the normal mode when an authenticated state and a secured state are combined.

In FIG. 7, the RFID tag may transition from an acknowledged state to an open state, in response to a message Req_RN from the interrogator.

Subsequently, the RFID tag may transmit, to the interrogator, a message Reply in response to the message Req_RN. Here, the message Reply may include a parameter Handle.

Here, the RFID tag may perform the same function as in the open state of the ISO/IEC 18000-6 Type C, by transitioning to the open state. Also, the RFID tag may perform functions corresponding to a security-related command, an encryption engine initialization command, a tag authentication command, and the like. In other words, each of the RFID tag and the interrogator may perform at least one of an RFID tag authentication, an interrogator authentication, and a mutual authentication.

Specifically, the interrogator may transmit, to the RFID tag, a security initial message Sec_Init. Here, the message Sec_Init may be used to initialize the encryption engine of the RFID tag. Subsequently, the RFID tag may transmit, to the interrogator, a message Reply in response to the message Sec_Init. In response to the message Reply, the interrogator may generate challenge interrogator information ChInt using a random function, and may encrypt the generated challenge interrogator information ChInt. Subsequently, the interrogator may insert, into an authentication request message ReqAuth, the encrypted challenge interrogator information ChInt and a parameter Handle, and then may transmit the authentication request message ReqAuth to the RFID tag.

When the authentication request message ReqAuth is received, the RFID tag may decrypt the challenge interrogator information ChInt in the received authentication request message ReqAuth, and may re-encrypt the decrypted challenge interrogator information ChInt. Additionally, the RFID tag may generate challenge tag information ChTag using the random function, and may encrypt the generated challenge tag information ChTag. Subsequently, the RFID tag may insert, into a message Reply, the encrypted challenge tag information ChTag, the re-encrypted challenge interrogator information ChInt, and the parameter Handle, and may transmit the message Reply to the interrogator.

When the message Reply is received, the interrogator may decrypt the re-encrypted challenge interrogator information ChInt in the received message Reply, and may determine whether the decrypted challenge interrogator information ChInt is identical to prestored challenge interrogator information ChInt. Here, when the decrypted challenge interrogator information ChInt is determined to be identical to the prestored challenge interrogator information ChInt, the interrogator may determine that the authentication of the RFID tag succeeds. Conversely, when the decrypted challenge interrogator information ChInt is determined to be different from the prestored challenge interrogator information ChInt, the interrogator may determine that the authentication of the RFID tag fails.

Subsequently, the interrogator may decrypt the encrypted challenge tag information ChTag in the received message Reply, and may re-encrypt the decrypted challenge tag information ChTag. Additionally, the interrogator may insert the re-encrypted challenge tag information ChTag into an authentication request message ReqAuth, and may transmit the authentication request message ReqAuth to the RFID tag. In response to the authentication request message ReqAuth, the RFID tag may decrypt the re-encrypted challenge tag information ChTag. Additionally, the RFID tag may determine whether the decrypted challenge tag information ChTag is identical to prestored challenge tag information ChTag. When the decrypted challenge tag information ChTag is determined to be identical to the prestored challenge tag information ChTag, the RFID tag may determine that the authentication of the interrogator succeeds. When the authentication of the interrogator succeeds, the RFID tag may insert the parameter Handle into a message Reply in response to the authentication request message ReqAuth, and may then transmit the message Reply to the interrogator. Conversely, when the decrypted challenge tag information ChTag is determined to be different from the prestored challenge tag information ChTag, the RFID tag may determine that the authentication of the interrogator fails. When the authentication of the interrogator fails, the RFID tag may not transmit, to the interrogator, the message Reply in response to the authentication request message ReqAuth.

Figure 8:
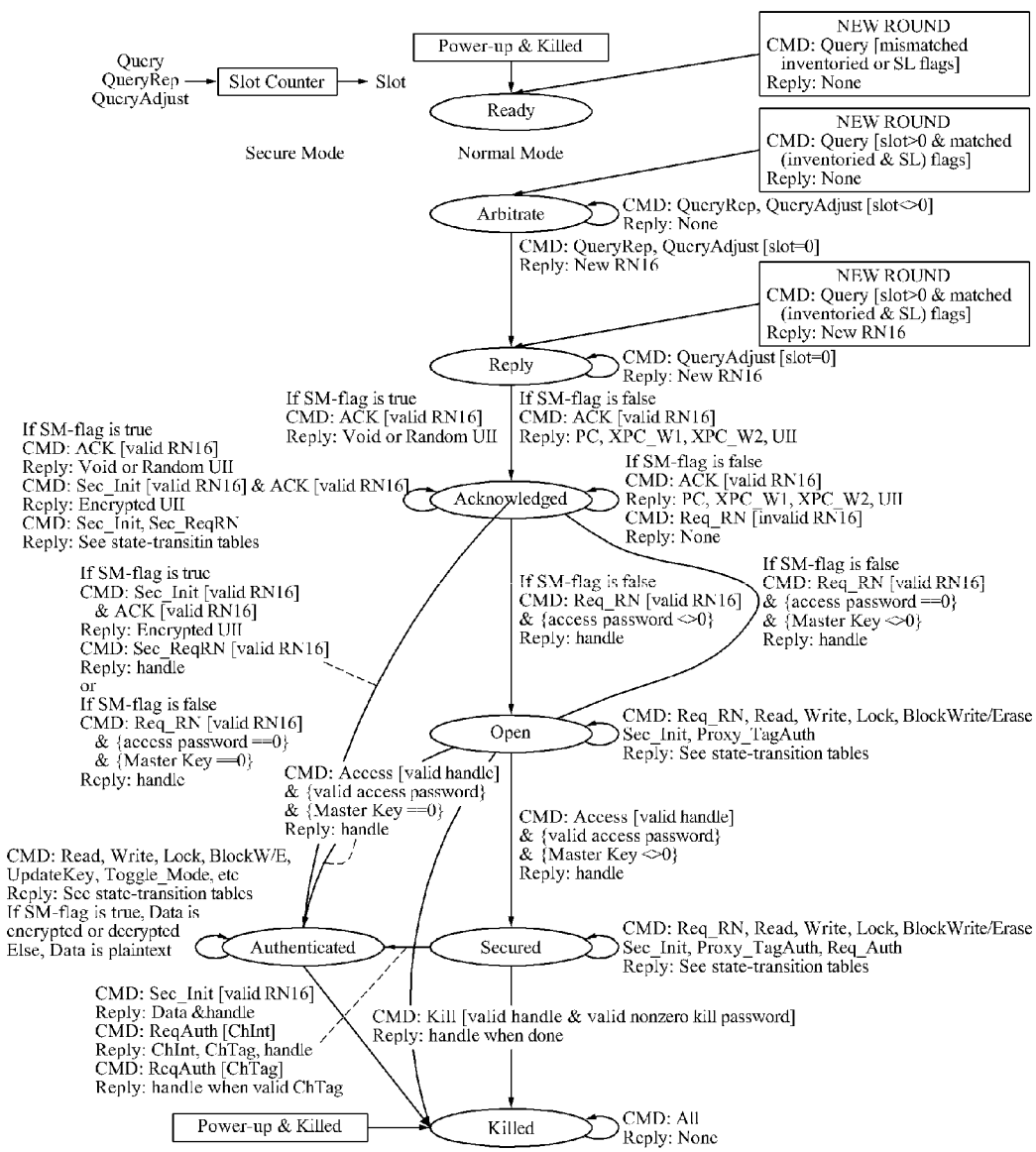
FIG. 8 is a state transition diagram of an RFID tag based on the flowchart of FIG. 4 according to an embodiment of the present invention.

FIG. 8 is a state transition diagram of the RFID tag based on the flowchart of FIG. 4 according to an embodiment of the present invention. In particular, in FIG. 8, a secured state for accepting an AP command is separated from an authenticated state for accepting a security authentication process, differently from FIG. 5.

In FIG. 8, the RFID tag may receive a QueryRep from the interrogator in the arbitrate state, and may transmit, to the interrogator, the parameter RN16 in response to the QueryRep in the reply state. Additionally, when an ACK (RN16) is received from the interrogator in response to the parameter RN16, the RFID tag may transition from the reply state to the acknowledged state.

Here, the RFID tag may transition from the acknowledged state to the open state, the secured state or the authenticated state, based on the current operating mode.

Specifically, when the current operating mode is determined to be the secure mode, the RFID tag may transition from the acknowledged state to the authenticated state or the arbitrate state, based on whether the authentication of the interrogator succeeds. When the authentication of the interrogator succeeds, the RFID tag may transition from the acknowledged state to the authenticated state. Accordingly, in the secure mode, the RFID tag may quickly perform the inventory process by transitioning directly to the authenticated state. Conversely, when the authentication of the interrogator fails, the RFID tag may transition from the acknowledged state to the arbitrate state.

Additionally, when the current operating mode is determined to be the normal mode, the RFID tag may transition from the acknowledged state to the authenticated state, the secured state, or the open state, based on whether the AP and the MK exist.

In an example, when neither the MK nor the AP exists (MK=0, AP=0), the RFID tag may transition from the acknowledged state to the authenticated state. In this example, the RFID tag in the authenticated state may execute a command related to setting of the MK and mode change. The interrogator may add, delete, or modify the MK stored in the RFID tag, and may change the current operating mode of the RFID tag.

In another example, when the MK exists, but the AP does not exist (MK<>0, AP=0), the RFID tag may transition from the acknowledged state to the secured state. In this example, the RFID tag in the secured state may perform the authentication of the interrogator, and may transition from the secured state to the authenticated state or the arbitrate state, based on whether the authentication of the interrogator succeeds. Specifically, when the authentication of the interrogator succeeds, the RFID tag may transition to the authenticated state. Conversely, when the authentication of the interrogator fails, the RFID tag may transition to the arbitrate state.

In still another example, when the AP exists (AP<>0), the RFID tag may transition from the acknowledged state to the open state. In this example, when the RFID tag transitions to the open state, and when the MK exists, the RFID tag may transition from the open state to the secured state, through matching of the AP. Additionally, the RFID tag may perform the authentication of the interrogator in the secured state, and may transition from the secured state to the authenticated state or the arbitrate state, based on whether the authentication of the interrogator succeeds. Specifically, when the authentication of the interrogator succeeds, the RFID tag may transition to the authenticated state. Conversely, when the authentication of the interrogator fails, the RFID tag may transition to the arbitrate state.

Figure 9:
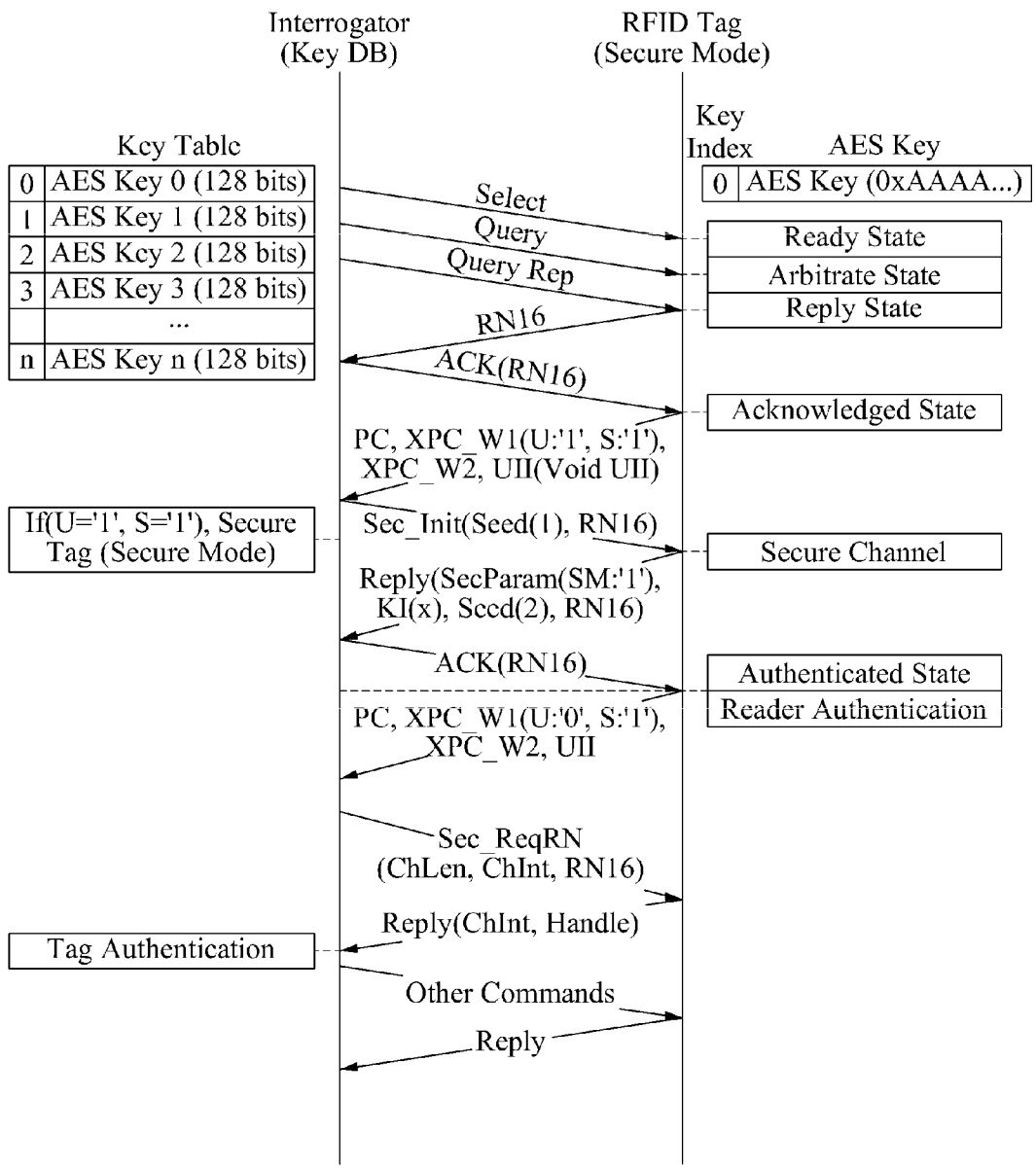
FIG. 9 is a diagram illustrating a security inventory process including a mutual authentication between an RFID tag and an interrogator in a secure mode, according to another embodiment of the present invention.

FIG. 9 is a diagram illustrating a security inventory process between an RFID tag and an interrogator in a secure mode, according to an embodiment of the present invention. Specifically, FIG. 9 illustrates the security inventory process in the secure mode when an authenticated state and a secured state are separated among operating states of the RFID tag. Additionally, the RFID tag of FIG. 9 may be substantially identical to the RFID tag of FIG. 6, except for an operating state for performing a mutual authentication and accordingly, a further description thereof will be omitted.

In FIG. 9, when a secure channel is formed between the RFID tag and the interrogator, the RFID tag may encrypt PC information, parameters XPC_W1 and XPC_W2, and UII information, and may transmit, to the interrogator via the secure channel, the encrypted PC information, the encrypted parameters XPC_W1 and XPC_W2, and the encrypted UII information. Additionally, the RFID tag may perform a mutual authentication with the interrogator, using challenge interrogator information ChInt, challenge length information ChLen, and parameters Handle and RN16. Here, the RFID tag may perform the mutual authentication with the interrogator in the acknowledged state. The operation of performing the mutual authentication between the RFID tag and the interrogator using the challenge interrogator information ChInt, the challenge length information ChLen, and the parameters Handle and RN16 has already been described in detail with reference to FIG. 6 and accordingly, a further description thereof will be omitted.

When the mutual authentication succeeds, the RFID tag may transition from the acknowledged state to the authenticated state. In other words, when the secured state and the authenticated state are combined, the RFID tag may transition to the secured state, based on a success of the mutual authentication. When the secured state and the authenticated state are separated, the RFID tag may transition from the acknowledged state to the authenticated state, based on the success of the mutual authentication.

Conversely, when the mutual authentication fails, the RFID tag may transition from the acknowledged state to the arbitrate state, regardless of whether the secured state and the authenticated state are combined or separated.

Figure 10:
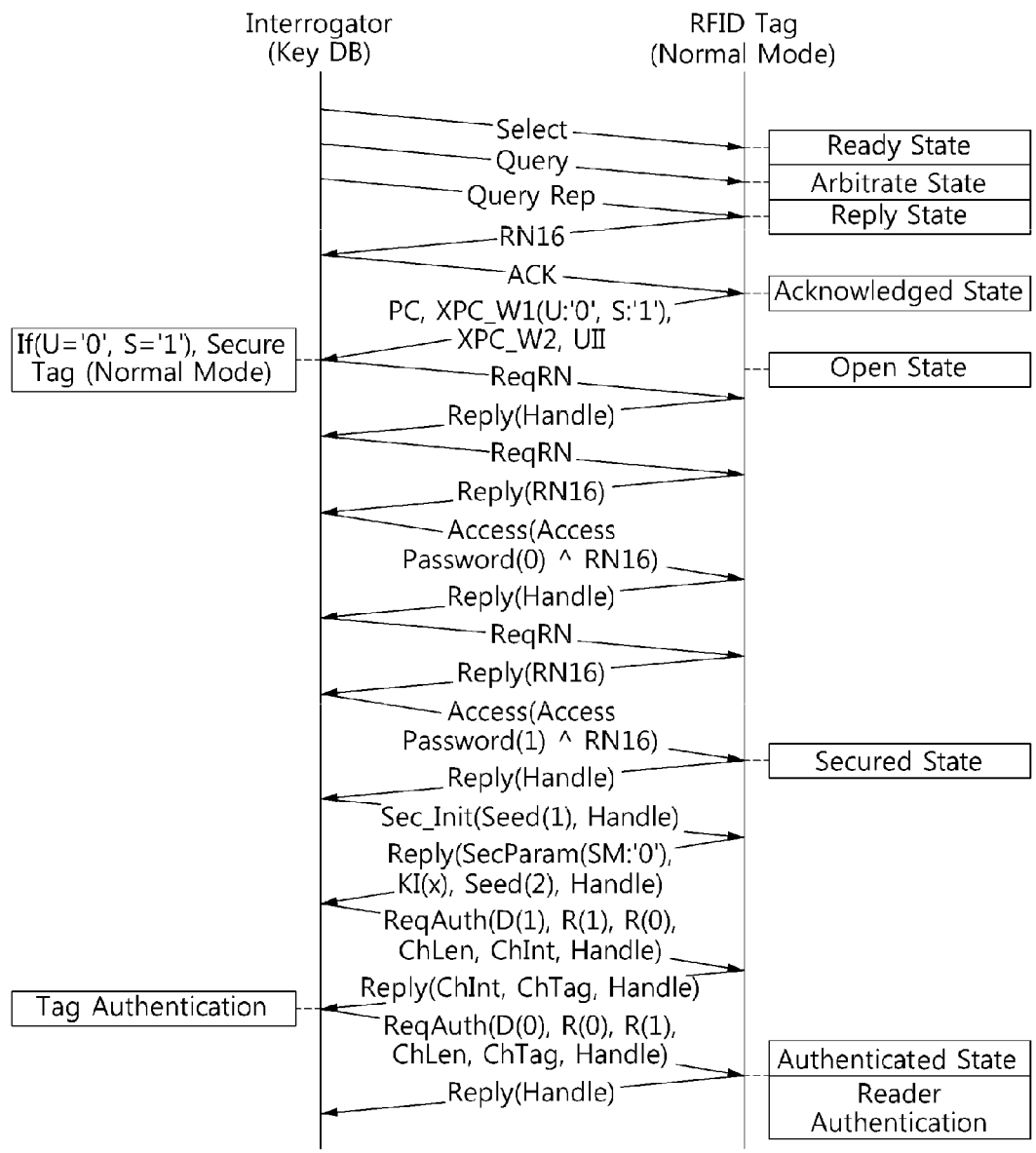
FIG. 10 is a diagram illustrating a mutual authentication process after an inventory process between an RFID tag and an interrogator in a normal mode, according to another embodiment of the present invention.

FIG. 10 is a diagram illustrating a mutual authentication process after an inventory process between an RFID tag and an interrogator in a normal mode, according to an embodiment of the present invention. In particular, FIG. 10 illustrates the mutual authentication process in the normal mode when an authenticated state and a secured state are separated. Additionally, the RFID tag of FIG. 10 may be substantially identical to the RFID tag of FIG. 7, except for an operating state for performing the AP command and accordingly, a further description thereof will be omitted.

In FIG. 10, the RFID tag may transition to the authenticated state, the secured state, or the open state, based on whether an AP and an MK exist.

In an example, when the RFID tag transitions to the authenticated state, the interrogator may add, delete, or change the MK of the RFID tag. Additionally, the interrogator may change a current operating mode of the RFID tag. For example, when the RFID tag is currently operated in the normal mode, the interrogator may change the normal mode to the secure mode.

In another example, when the RFID tag transitions to the secured state, the RFID tag may perform a mutual authentication with the interrogator. Specifically, the RFID tag may perform the mutual authentication with the interrogator, using challenge interrogator information ChInt, challenge tag information ChTag, and a parameter Handle. Additionally, the RFID tag may transition to the authenticated state or the arbitrate state, based on whether the mutual authentication succeeds.

The example of verifying the encryption engine of the RFID tag and the authentication function using the parameter XPC_W2 has been described above. However, a message Get_Capabilities may be used instead of the parameter XPC_W2.

Figure 11:
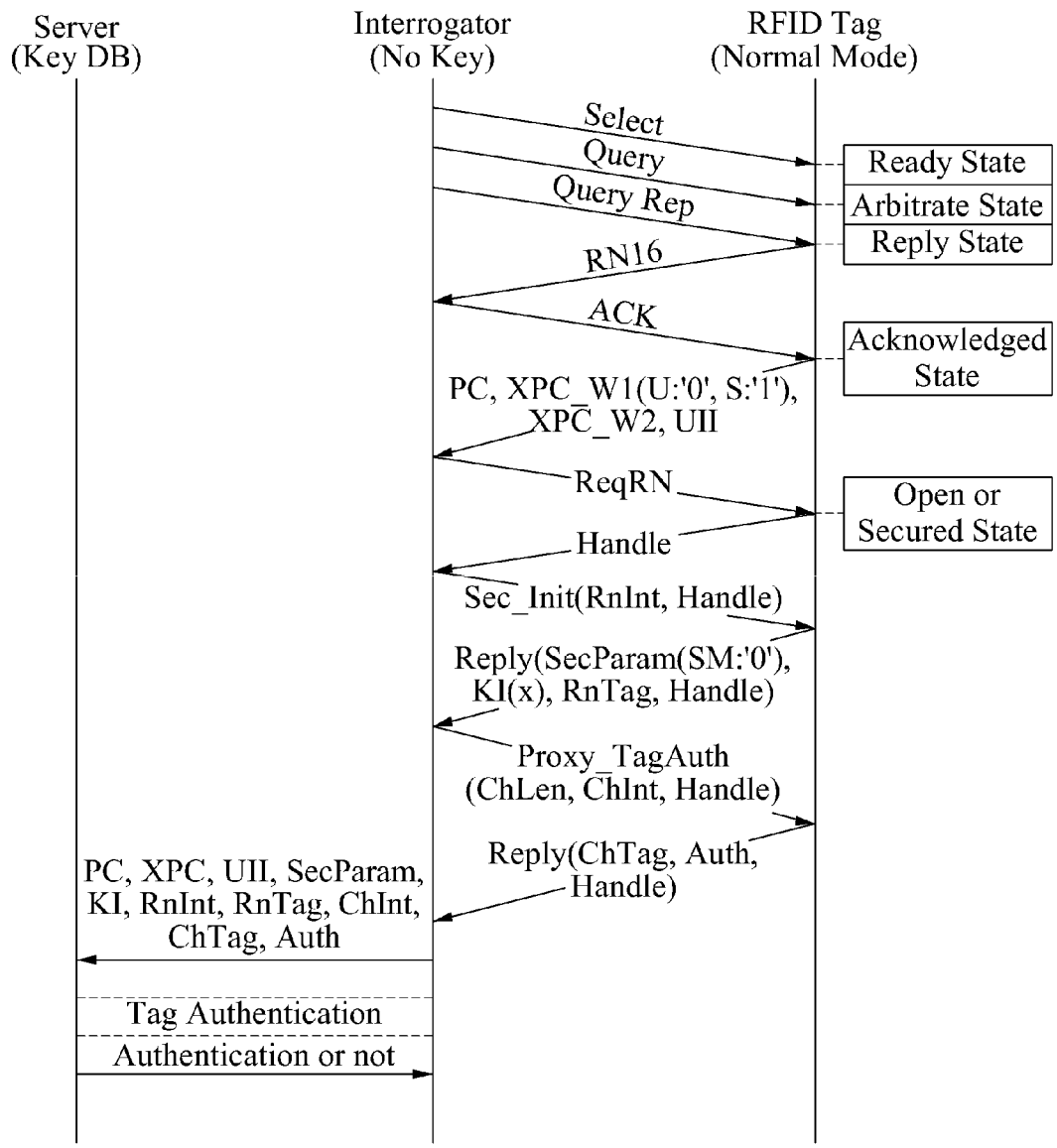
FIG. 11 is a diagram illustrating an operation of authenticating an RFID tag using an authentication server according to an embodiment of the present invention.

FIG. 11 is a diagram illustrating an operation of authenticating an RFID tag using an authentication server according to an embodiment of the present invention.

In FIG. 11, an encryption module and an MK may be stored in each of the authentication server and the RFID tag, however, may not be stored in an interrogator. Accordingly, the interrogator may authenticate the RFID tag using the authentication server.

Specifically, when the RFID tag transitions to an open state or a secured state, the interrogator may verify the encryption function of the RFID tag using the parameter XPC_W2 acquired through the inventory process.

Subsequently, the interrogator may transmit a proxy tag authentication message Proxy_TagAuth to the RFID tag. Here, the proxy tag authentication message Proxy_TagAuth may include challenge length information ChLen, challenge interrogator information ChInt, and parameter Handle. The RFID tag may receive the proxy tag authentication message Proxy_TagAuth, and may extract the challenge interrogator information ChInt from the received proxy tag authentication message Proxy_TagAuth. Subsequently, the RFID tag may generate challenge tag information ChTag using a random function, and may generate authentication information Auth based on the generated challenge tag information ChTag and the extracted challenge interrogator information ChInt. For example, the RFID tag may perform an eXclusive OR (XOR) operation on the challenge tag information ChTag and the challenge interrogator information ChInt, and may generate the authentication information Auth. Additionally, the RFID tag may individually encrypt the authentication information Auth and the challenge tag information ChTag, may insert the encrypted authentication information Auth and the encrypted challenge tag information ChTag into a message Reply, and may transmit the message Reply to the interrogator. Here, the message Replay may include the encrypted challenge tag information ChTag, the encrypted authentication information Auth, and the parameter Handle.

The interrogator may receive the message Reply from the RFID tag, and may extract, from the message Reply, the encrypted challenge tag information ChTag and the encrypted authentication information Auth. Additionally, the interrogator may transmit, to the authentication server, the encrypted challenge tag information ChTag, the encrypted authentication information Auth, challenge interrogator information ChInt, PC information, parameters XPC_W1 and XPC_W2, tag identification information, and the like. Here, the tag identification information may include UII information, and EPC information.

The authentication server may perform an authentication of the RFID tag, using the encrypted challenge tag information ChTag, the encrypted authentication information Auth, the challenge interrogator information ChInt, the PC information, the parameters XPC_W1 and XPC_W2, the tag identification information, and the like. Specifically, the authentication server may decrypt the encrypted challenge tag information ChTag, and the encrypted authentication information Auth. Additionally, the authentication server may perform an XOR operation on the challenge interrogator information ChInt, and the decrypted challenge tag information ChTag. Subsequently, the authentication server may compare an XOR operation result with the decrypted authentication information Auth, and may perform the authentication of the RFID tag. Here, when the XOR operation result is identical to the decrypted authentication information Auth, the authentication server may determine that the RFID tag is true, and may notify the interrogator of a success of the authentication of the RFID tag. Conversely, when the XOR operation result is different from the decrypted authentication information Auth, the authentication server may determine that the RFID tag is false, and may notify the interrogator of a failure of the authentication of the RFID tag.

Figure 12:
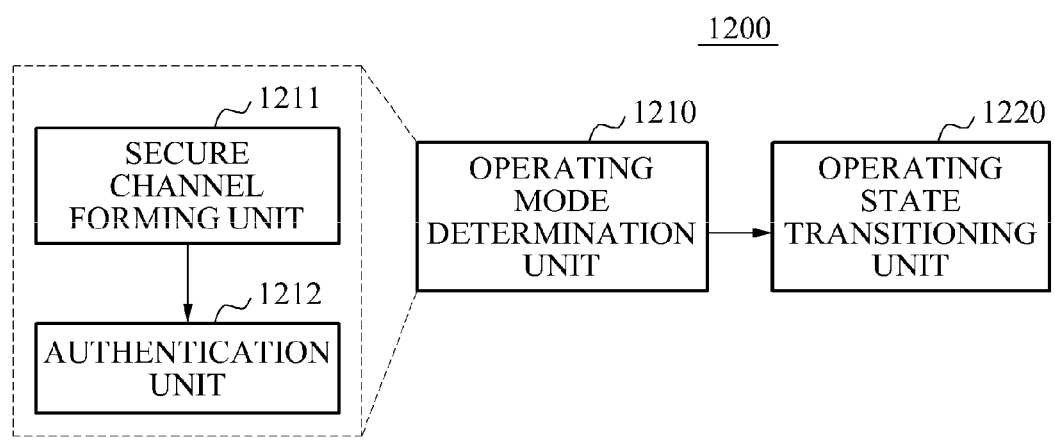
FIG. 12 is a block diagram illustrating a configuration of an RFID tag according to an embodiment of the present invention.

FIG. 12 is a block diagram illustrating a configuration of an RFID tag 1200 according to an embodiment of the present invention.

In FIG. 12, the RFID tag 1200 may include an operating mode determination unit 1210, and an operating state transitioning unit 1220. In FIG. 12, when a current operating mode of the RFID tag 1200 is determined to be a secure mode, the operating mode determination unit 1210 may include a secure channel forming unit 1211 and an authentication unit 1212. Additionally, when the current operating mode is determined to be a normal mode, the operating mode determination unit 1210 may include the authentication unit 1212, however, may include or not include the secure channel forming unit 1211.

The operating mode determination unit 1210 may determine whether the current operating mode of the RFID tag 1200 is the normal mode or the secure mode. Here, the operating mode determination unit 1210 may include the secure channel forming unit 1211 and the authentication unit 1212.

Specifically, the operating mode determination unit 1210 may determine the current operating mode, based on a SM_flag stored in a memory of the RFID tag 1200. For example, when the SM_flag is equal to "1," the operating mode determination unit 1210 may determine the current operating mode to be the secure mode. Additionally, when the SM_flag is equal to "0," the operating mode determination unit 1210 may determine the current operating mode to be the normal mode.

The operating state transitioning unit 1220 may transition from a current operating state of the RFID tag 1200 to another operating tag, based on the current operating mode, and based on whether an authentication of an interrogator succeeds. Here, when the current operating mode is determined to be the secure mode, the secure channel forming unit 1211 may form a secure channel with the interrogator. When the secure channel is formed, the authentication unit 1212 may perform the authentication of the interrogator. Here, the interrogator may perform an authentication of the RFID tag 1200, if needed.

In an example, when the secured state and the authenticated state are combined, and when the current operating mode is determined to be the secure mode, the authentication unit 1212 may perform the authentication of the interrogator in the acknowledged state. The operating state transitioning unit 1220 may transition to the secured state or the arbitrate state, based on whether the authentication of the interrogator succeeds.

Specifically, the authentication unit 1212 may encrypt PC information, parameters XPC_W1 and XPC_W2, and tag identification information, and may transmit, to the interrogator, the encrypted PC information, the encrypted parameters XPC_W1 and XPC_W2, and the encrypted tag identification information. Subsequently, the operating state transitioning unit 1220 may transition from the acknowledged state to the secured state through the authentication of the interrogator, and may complete the inventory process. Additionally, the operating mode determination unit 1210 may determine whether to maintain or terminate the secure channel, based on whether the authentication of the interrogator succeeds. For example, when the authentication of the interrogator succeeds, the operating mode determination unit 1210 may continue to maintain the secure channel, and the operating state transitioning unit 1220 may transition to the secured state. Conversely, when the authentication of the interrogator fails, the operating mode determination unit 1210 may terminate the secure channel with the interrogator, and the operating state transitioning unit 1220 may transition to the arbitrate state.

In another example, when the secured state and the authenticated state are combined, and when the current operating mode is determined to be the normal mode, the operating state transitioning unit 1220 may transition to the open state or the secured state, based on whether an MK exists. Specifically, when the MK exists, the operating state transitioning unit 1220 may transition to the open state. Conversely, when the MK does not exist, the operating state transitioning unit 1220 may transition to the secured state. When the RFID tag 1200 transitions to the open state, the authentication unit 1212 may perform an authentication of the interrogator. The operating state transitioning unit 1220 may transition from the open state to the secured state or the arbitrate state, based on whether the authentication of the interrogator succeeds. Here, in the normal mode, the secure channel forming unit 1211 may or may not form a secure channel with the interrogator.

In still another example, when the secured state and the authenticated state are separated, and when the current operating mode is determined to be the secure mode, the operating state transitioning unit 1220 may transition from the acknowledged state to the authenticated state or the arbitrate state.

In yet another example, when the secured state and the authenticated state are separated, and when the current operating mode is determined to be the normal mode, operating state transitioning unit 1220 may transition from the acknowledged state to the authenticated state, the secured state, or the open state, based on an MK and an AP.

When the authentication of the interrogator is performed, the authentication unit 1212 may generate challenge tag information using a random function. Additionally, the authentication unit 1212 may encrypt the generated challenge tag information, and may transmit the encrypted challenge tag information to the interrogator. Subsequently, the authentication unit 1212 may receive, from the interrogator, challenge tag information re-encrypted by the interrogator, and may decrypt the received challenge tag information. Additionally, the authentication unit 1212 may determine whether the decrypted challenge tag information is identical to the generated challenge tag information. When the decrypted challenge tag information is determined to be identical to the generated challenge tag information, the authentication unit 1212 may determine that the authentication of the interrogator succeeds. Conversely, when the decrypted challenge tag information is determined to be different from the generated challenge tag information, the authentication unit 1212 may determine that the authentication of the interrogator fails.

Figure 13:
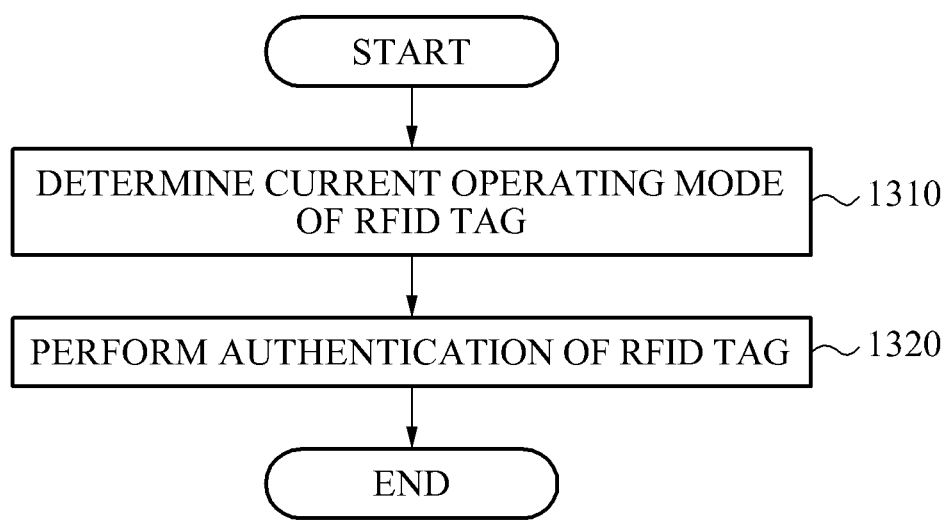
FIG. 13 is a flowchart illustrating an operation of an interrogator according to an embodiment of the present invention.

FIG. 13 is a flowchart illustrating an operation of an interrogator according to an embodiment of the present invention.

In FIG. 13, in operation 1310, the interrogator may determine a current operating mode of an RFID tag. Specifically, the interrogator may determine the current operating mode of the RFID tag, based on a parameter XPC_W1 received from the RFID tag. Here, the parameter XPC_W1 may include a U flag and an S flag. For example, the interrogator may determine, based on the U flag, whether the current operating mode of the RFID tag is a normal mode or a secure mode. In this example, during an inventory process, when the U flag is equal to "1," the interrogator may recognize tag identification information as untraced UII information, and may determine the current operating mode of the RFID tag to be the secure mode. When the U flag is equal to "0," the interrogator may determine the current operating mode to be the normal mode.

In operation 1320, the interrogator may perform an authentication of the RFID tag, based on the current operating mode of the RFID tag.

In an example, when the current operating mode is determined to be the normal mode, the interrogator may perform the authentication of the RFID tag, using challenge length information, challenge tag information, and challenge interrogator information.

Specifically, the interrogator may generate challenge interrogator information using a random function. Additionally, the interrogator may encrypt the generated challenge interrogator information, and may transmit the encrypted challenge interrogator information to the RFID tag. The RFID tag may decrypt the encrypted challenge interrogator information, and may re-encrypt the decrypted challenge interrogator information. Additionally, the RFID tag may generate challenge tag information using a random function, and may encrypt the generated challenge tag information.

Subsequently, the RFID tag may insert the encrypted challenge tag information and the re-encrypted challenge interrogator information into a reply message, and may then transmit the reply message to the interrogator. When the reply message is received, the interrogator may decrypt the re-encrypted challenge interrogator information in the received reply message, may determine whether the decrypted challenge interrogator information is identical to prestored challenge interrogator information, and may perform the authentication of the RFID tag. Here, when the decrypted challenge interrogator information is determined to be identical to the prestored challenge interrogator information, the interrogator may determine that the authentication of the RFID tag succeeds. Conversely, when the decrypted challenge interrogator information is determined to be different from the prestored challenge interrogator information, the interrogator may determine that the authentication of the RFID tag fails. Subsequently, the interrogator may decrypt challenge tag information, may re-encrypt the decrypted challenge tag information, and may transmit the re-encrypted challenge tag information to the RFID tag. When the re-encrypted challenge tag information is received, the RFID tag may decrypt the re-encrypted challenge tag information, may determine whether the decrypted challenge tag information is identical to prestored challenge tag information, and may perform an authentication of the interrogator. Here, when the decrypted challenge tag information is determined to be identical to the prestored challenge tag information, the RFID tag may determine that the authentication of the interrogator succeeds, and may transmit a reply message to the interrogator. Conversely, when the decrypted challenge tag information is determined to be different from the prestored challenge tag information, the RFID tag may determine that the authentication of the interrogator fails, and may not transmit the reply message to the interrogator.

In another example, when the current operating mode is determined to be the secure mode, the interrogator may perform the authentication of the RFID tag, using challenge length information, challenge interrogator information, and parameters RN16 and Handle. In the secure mode, the interrogator may form a secure channel with the RFID tag.

Specifically, the interrogator may generate challenge interrogator information using a random function. Additionally, the interrogator may individually encrypt the generated challenge interrogator information and the parameter RN16, and may transmit, to the RFID tag, the encrypted challenge interrogator information and the encrypted parameter RN16. Here, the interrogator may insert, into a message Sec_ReqRN, the encrypted parameter RN16, the encrypted challenge interrogator information, and challenge length information, and then may transmit the message Sec_ReqRN to the RFID tag. When the message Sec_ReqRN is received, the RFID tag may decrypt the parameter RN16 in the received message Sec_ReqRN, and may determine whether the decrypted parameter RN16 is identical to a prestored parameter RN16. Here, when the two parameters RN16 are determined to be identical to each other, the RFID tag may determine to continue to maintain the secure channel. Conversely, when the two parameters RN16 are determined to be different from each other, the RFID tag may determine to terminate the secure channel. Subsequently, the RFID tag may decrypt the challenge interrogator information, and may re-encrypt the decrypted challenge interrogator information. Here, the RFID tag may encrypt a parameter Handle, and may transmit, to the interrogator, the re-encrypted challenge interrogator information together with the encrypted parameter Handle. When the re-encrypted challenge interrogator information and the encrypted parameter Handle are received, the interrogator may decrypt the re-encrypted challenge interrogator information, may determine whether the decrypted challenge interrogator information is identical to prestored challenge interrogator information, and may perform the authentication of the RFID tag. When the authentication of the RFID tag succeeds, the interrogator may continue to maintain the secure channel. Conversely, when the authentication of the RFID tag fails, the interrogator may terminate the secure channel. When the secure channel is continuously maintained, each of the interrogator and the RFID tag may maintain the secure channel by monitoring the parameter Handle, or may ignore a message corresponding to an incorrect parameter Handle.

In FIG. 13, when mutual authentication between the RFID tag and the interrogator succeeds, the interrogator may delete, add, or change the MK stored in the RFID tag. Additionally, when the mutual authentication succeeds, the interrogator may change the current operating mode of the RFID tag.

Figure 14:
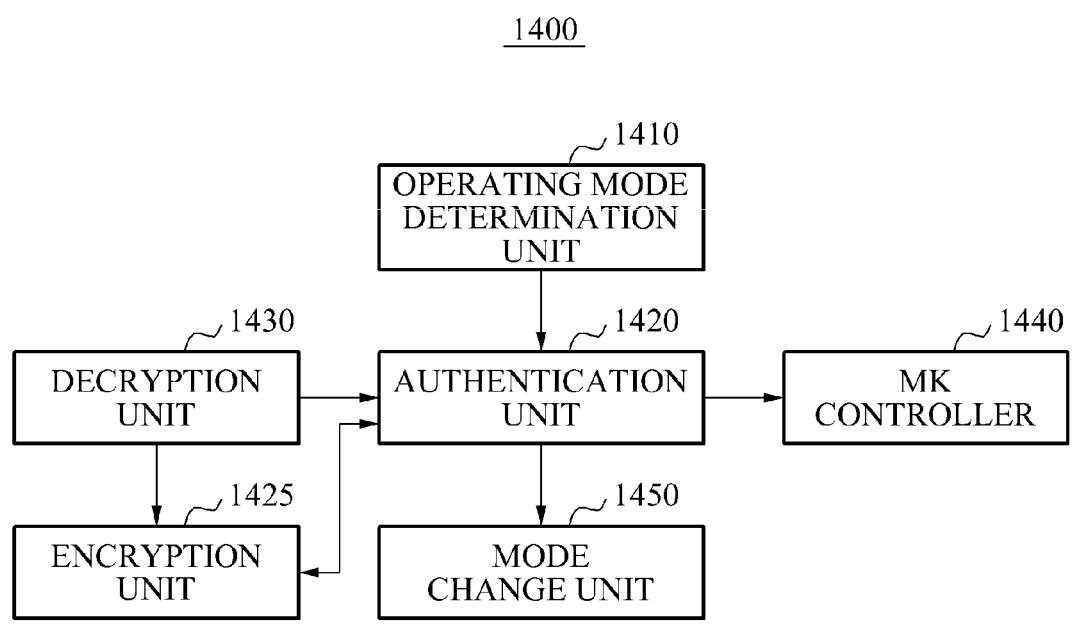
FIG. 14 is a block diagram illustrating a configuration of an interrogator according to an embodiment of the present invention.

FIG. 14 is a block diagram illustrating a configuration of an interrogator 1400 according to an embodiment of the present invention.

Referring to FIG. 14, the interrogator 1400 may include an operating mode determination unit 1410, an authentication unit 1420, an encryption unit 1425, a decryption unit 1430, an MK controller 1440, and a mode change unit 1450.

The operating mode determination unit 1410 may determine whether a current operating mode of an RFID tag is a normal mode or a secure mode. Here, the operating mode determination unit 1410 may determine the current operating mode of the RFID tag, based on a U flag inserted into a parameter XPC_W1 that is received from the RFID tag during an inventory process.

The authentication unit 1420 may perform an authentication of the RFID tag, based on the current operating mode of the RFID tag. Additionally, the authentication unit 1420 may generate challenge interrogator information using a random function. The encryption unit 1425 may encrypt the generated challenge interrogator information, and may transmit the encrypted challenge interrogator information to the RFID tag. Here, the RFID tag may perform an authentication of the interrogator 1400. In other words, the RFID tag and the interrogator 1400 may perform a mutual authentication.

In an example, when the current operating mode is determined to be the normal mode, the authentication unit 1420 may perform an authentication of the RFID tag, using challenge tag information, challenge interrogator information, and challenge length information.

In another example, when the current operating mode is determined to be the secure mode, the authentication unit 1420 may perform an authentication of the RFID tag, using challenge length information, challenge interrogator information, and parameters RN16 and Handle.

Additionally, the decryption unit 1430 may decrypt challenge interrogator information that is encrypted by the RFID tag. The authentication unit 1420 may determine whether the decrypted challenge interrogator information is identical to prestored challenge interrogator information, and may perform the authentication of the RFID tag. Here, the prestored challenge interrogator information may be generated using the random function by the authentication unit 1420.

When the authentication of the RFID tag succeeds, the MK controller 1440 may change, add, or delete an MK stored in the RFID tag.

Additionally, when the authentication of the RFID tag succeeds, the mode change unit 1450 may change the current operating mode of the RFID tag. In an example, when the current operating mode is determined to be the normal mode, the interrogator 1400 may change the current operating mode to the secure mode, and may set a SM_flag to "1". In another example, when the current operating mode is determined to be the secure mode, the interrogator 1400 may change the current operating mode to the normal mode, and may set the SM_flag to "0".

The example in which the interrogator directly performs the authentication of the RFID tag has been described with reference to FIGS. 13 and 14. When an MK is not stored in the interrogator, the interrogator may perform the authentication of the RFID tag using an authentication server.

In an RFID tag and a method of operating the RFID tag according to an embodiment of the present invention, whether the RFID tag is a secure tag or a normal tag may be determined based on whether an encryption engine is loaded in the RFID tag. Specifically, when the encryption engine is loaded in the RFID tag, the RFID tag may be determined to be the secure tag. Conversely, when the encryption engine is not loaded in the RFID tag, the RFID tag may be determined to be the normal tag. Similarly, when the encryption engine is loaded in an interrogator, the interrogator may be determined to be a secure interrogator. When the encryption engine is not loaded in the interrogator, the interrogator may be determined to be a normal interrogator.

Here, when the RFID tag is determined to be the secure tag, the secure tag may perform a communication with the secure interrogator or a communication with the normal interrogator, based on a current operating mode of the RFID tag. In other words, the secure tag may provide not only a compatibility with the secure interrogator but also a compatibility with the normal interrogator.

For example, when the current operating mode is determined to be a normal mode, the secure tag may perform the communication with the normal interrogator using tag identification information. In the normal mode, the tag identification information may include EPC information or UII information.

Additionally, when the current operating mode is determined to be a secure mode, the secure tag may perform the communication with the secure interrogator using optional UII information. Here, the optional UII information may include untraced UII information, or void UII information.

Additionally, when the current operating mode is determined to be a secure mode, the secure tag may perform the communication with the secure interrogator or the communication with the normal interrogator using optional UII information. In the secure mode, the communication with the secure interrogator may be performed using an encryption channel. Here, the optional UII information may include untraced UII information, or void UII information.

What is claimed is:

1. A method of interrogator authentication, the method comprising:
    generating randomly, by the interrogator, random interrogator information (RnInt) for initialization an encryption engine, and transmitting the random interrogator information to the tag;
    generating randomly, by the tag, random tag information (RnTag) and initializing an encryption engine of tag using the random interrogator information and random tag information;
    transmitting, by the tag, random tag information to the interrogator;
    initializing, by the interrogator, an encryption engine of interrogator using the random interrogator information and random tag information;
    transmitting, by the interrogator, a request for challenge tag information to a tag;
    generating randomly, by the tag, the challenge tag information, encrypting the challenge tag information and transmitting the encrypted challenge tag information to the interrogator,
    decrypting, by the interrogator, the encrypted challenge tag information, re-encrypting the decrypted challenge tag information and transmitting the re-encrypted challenge tag information to the tag;
    receiving, by the tag, the re-encrypted challenge tag information from the interrogator, and decrypting the re-encrypted challenge tag information; and
    comparing, by the tag, the decrypted challenge tag information received by the interrogator with the pre-stored generated challenge tag information, and performing the authentication of the interrogator,
    wherein the secure tag is determined when an encryption engine is loaded in the tag.

2. The method of claim 1, further comprising:
    deleting, changing, or adding, by the interrogator, a Master Key (MK) of the tag, when the authentication of the interrogator succeeds.

3. The method of claim 1, further comprising:
    changing, by the interrogator, the current operating mode of the tag, when the authentication of the interrogator succeeds.

4. The method of claim 1, further comprising:
    generating a secure channel between the interrogator and the tag, when the authentication of the interrogator succeeds.

5. The method of claim 1, further comprising:
    transmitting, by the tag, an PC information, an XPC_W1, the XPC_W2, and the tag information to the interrogator,
    wherein XPC_W1 comprises tag information to identify a normal tag or secure tag and operating mode of tag, wherein XPC_W2 comprises information related to tag authentication, interrogator authentication, mutual authentication, and tag authentication associated with authentication server.

6. A method of tag authentication, the method comprising:
generating randomly, by the interrogator, random interrogator information (RnInt) for initialization an encryption engine, and transmitting the random interrogator information to the tag;
generating randomly, by the tag, random tag information (RnTag) and initializing an encryption engine of tag using the random interrogator information and random tag information;
transmitting, by the tag, random tag information to the interrogator;
initializing, by the interrogator, an encryption engine of interrogator using the random interrogator information and random tag information;
generating randomly, by the interrogator, the challenge interrogator information, encrypting the challenge interrogator information and transmitting the encrypted challenge interrogator information to the tag,
decrypting, by the tag, the encrypted challenge interrogator information, re-encrypting the decrypted challenge interrogator information and transmitting the re-encrypted challenge interrogator information to the interrogator;
receiving, by the interrogator, the re-encrypted challenge interrogator information from the tag, and decrypting the re-encrypted challenge interrogator information; and
comparing, by the interrogator, the decrypted challenge interrogator information received by the tag with the pre-stored generated challenge interrogator information, and performing the authentication of the tag,
wherein the secure interrogator is determined when an encryption engine is loaded in the interrogator.

7. The method of claim 6, further comprising:
transmitting, by the tag, an PC information, an XPC_W1, the XPC_W2, and the tag information to the interrogator,
wherein XPC_W1 comprises tag information to identify a normal tag or secure tag and operating mode of tag,
wherein XPC_W2 comprises information related to tag authentication, interrogator authentication, mutual authentication, and tag authentication associated with authentication server.

8. A method of mutual authentication with respect to an interrogator and an tag, the method comprising:
generating randomly, by the interrogator, random interrogator information (RnInt) for initialization an encryption engine, and transmitting the random interrogator information to the tag;
generating randomly, by the tag, random tag information (RnTag) and initializing an encryption engine of tag using the random interrogator information and random tag information;
transmitting, by the tag, random tag information to the interrogator;
initializing, by the interrogator, an encryption engine of interrogator using the random interrogator information and random tag information;
generating randomly, by the interrogator, the challenge interrogator information, encrypting the challenge interrogator information;
transmitting, by the interrogator, a request for challenge tag information to a tag and the encrypted challenge interrogator information to the tag;
decrypting, by the tag, the encrypted challenge interrogator information, re-encrypting the decrypted challenge interrogator information;
generating randomly, by the tag, the challenge tag information, encrypting the challenge tag information;
transmitting, by the tag, the re-encrypted challenge interrogator information and the encrypted challenge tag information to the interrogator;
receiving, by the interrogator, the re-encrypted challenge interrogator information from the tag, and decrypting the re-encrypted challenge interrogator information;
comparing, by the interrogator, the decrypted challenge interrogator information with the generated challenge interrogator information, and performing the authentication of the tag;
decrypting, by the interrogator, the encrypted challenge tag information, re-encrypting the decrypted challenge tag information, when the authentication of the interrogator succeeds;
transmitting, by the interrogator, the re-encrypted challenge tag information to the tag;
receiving, by the tag, the re-encrypted challenge tag information from the interrogator, and decrypting the re-encrypted challenge tag information; and
comparing, by the tag, the decrypted challenge tag information received by the interrogator with the pre-stored generated challenge tag information, and the tag performing the authentication of the interrogator,
wherein the secure interrogator is determined when an encryption engine is loaded in the interrogator,
wherein the secure tag is determined when an encryption engine is loaded in the tag.

9. The method of claim 8, further comprising:
deleting, changing, or adding, by the interrogator, a Master Key (MK) of the tag, when the authentication of the interrogator succeeds.

10. The method of claim 8, further comprising:
changing, by the interrogator, the current operating mode of the tag, when the authentication of the interrogator succeeds.

11. The method of claim 8, further comprising:
generating a secure channel between the interrogator and the tag, when the authentication of the interrogator succeeds.

12. The method of claim 8, further comprising:
transmitting, by the tag, an PC information, an XPC_W1, the XPC_W2, and the tag information to the interrogator,
wherein XPC_W1 comprises tag information to identify a normal tag or secure tag and operating mode of tag,
wherein XPC_W2 comprises information related to tag authentication, interrogator authentication, mutual authentication, and tag authentication associated with authentication server.

13. A method of tag authentication using authentication server, the method comprising:
generating randomly, by the interrogator, random interrogator information (RnInt) for initialization an encryption engine, and transmitting the random interrogator information to the tag;
generating randomly, by the tag, random tag information (RnTag) and initializing an encryption engine of tag using the random interrogator information and random tag information;

transmitting, by the tag, random tag information to the interrogator;

transmitting, by the interrogator, the random interrogator information and random tag information to the authentication server;

initializing, by the authentication server, an encryption engine of the authentication server using the random interrogator information and random tag information;

generating randomly, by an interrogator, a challenge interrogator information, and transmitting the challenge interrogator information to an tag;

generating, by the tag, a first authentication data using the challenge interrogator information and the challenge tag information;

encrypting, by the tag, the challenge tag information and the first authentication data and transmitting the challenge tag information and the first authentication data to the interrogator;

transmitting, by the interrogator, the challenge interrogator information, an encrypted challenge tag information and an encrypted first authentication data to an authentication server;

decrypting, by the authentication server, the encrypted challenge tag information and the encrypted first authentication data;

generating, by the authentication server, an second authentication data using a decrypted challenge tag information and a challenge interrogator information;

performing, by the authentication server, the authentication of the tag by comparing a decrypted first authentication data received by the tag, with the second authentication data; and notifying the result of the authentication of the tag to the interrogator, wherein the normal interrogator is interrogator which an encryption engine is not loaded in the interrogator, wherein the secure tag is determined when an encryption engine is loaded in the tag.

\* \* \* \* \*